US009332562B2

(12) United States Patent
Mizusawa

(10) Patent No.: US 9,332,562 B2
(45) Date of Patent: May 3, 2016

(54) RADIO BASE STATION, COMMUNICATION CONTROL METHOD OF RADIO BASE STATION AND COMPUTER PROGRAM

(71) Applicant: Sony Corporation, Tokyo (JP)

(72) Inventor: Nishiki Mizusawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/358,279

(22) PCT Filed: Nov. 16, 2012

(86) PCT No.: PCT/JP2012/079791
§ 371 (c)(1),
(2) Date: May 15, 2014

(87) PCT Pub. No.: WO2013/084694
PCT Pub. Date: Jun. 13, 2013

(65) Prior Publication Data
US 2014/0302867 A1    Oct. 9, 2014

(30) Foreign Application Priority Data

Dec. 7, 2011    (JP) ................................ 2011-267636

(51) Int. Cl.
*H04W 72/04* (2009.01)
*H04W 72/00* (2009.01)
(Continued)

(52) U.S. Cl.
CPC .............. *H04W 72/10* (2013.01); *H04W 16/16* (2013.01); *H04L 1/1607* (2013.01); *H04L 5/0048* (2013.01); *H04L 5/0055* (2013.01); *H04L 5/0073* (2013.01); *H04W 84/045* (2013.01)

(58) Field of Classification Search
CPC ... H04W 72/042; H04W 24/08; H04W 24/10; H04W 72/0406; H04W 72/082; H04W 28/08; H04W 52/146; H04W 72/0413; H04W 72/085; H04W 48/16; H04W 52/0206; H04W 72/0453; H04W 72/12; H04W 88/02; H04W 72/04; H04W 72/00; H04L 1/00; H04L 5/00

USPC ......... 370/329, 252, 311, 280, 281, 312, 328, 370/331, 229, 230, 235, 241, 254, 330, 336, 370/341, 431; 455/522, 405, 404.2, 434, 455/452.1, 452.2, 456.1, 550.1, 561, 67.13, 455/418, 436, 450, 512
See application file for complete search history.

(56) References Cited

U.S. PATENT DOCUMENTS 7,352,709 B2 *  4/2008  Wakabayashi ................. 370/278
2003/0037146 A1 *  2/2003  O'Neill ......................... 709/226
(Continued)

FOREIGN PATENT DOCUMENTS

JP     09224283 A     8/1997
JP     2007266670 A   10/2007
(Continued)

OTHER PUBLICATIONS

No Author Listed, 3GPP TR 25.967 (May 2009), 3rd Generation Partnership Project, Technical Specification Group Radio Access Networks; Home Node B Radio Frequency (RF) Requirements (FDD) (Release 9), 55 pages.
(Continued)

*Primary Examiner* — Inder Mehra
(74) *Attorney, Agent, or Firm* — Sony Corporation

(57) ABSTRACT

Provided is a radio base station including a terminal detection unit that detects an uplink signal of a first terminal serviced by another base station, a storage unit that stores an allocation priority of a radio resource for a predetermined period, and a resource allocation unit that allocates a radio resource to a second terminal serviced by the radio base station, using the allocation priority of the radio resource stored in the storage unit. When the terminal detection unit detects the uplink signal of the first terminal, the resource allocation unit preferentially allocates a radio resource of an uplink of a high allocation priority to the second terminal while lowering an allocation priority of a radio resource estimated to be used next for the uplink by the first terminal.

15 Claims, 18 Drawing Sheets

(51) Int. Cl.
*H04L 1/00* (2006.01)
*H04W 72/10* (2009.01)
*H04W 16/16* (2009.01)
*H04L 5/00* (2006.01)
*H04L 1/16* (2006.01)
*H04W 84/04* (2009.01)

(56) References Cited

U.S. PATENT DOCUMENTS

2007/0237248 A1* 10/2007 Jung et al. ............... 375/260
2008/0075037 A1* 3/2008 Guo et al. ............... 370/329
2010/0322165 A1* 12/2010 Yoo ............... 370/329
2011/0267959 A1* 11/2011 Yi et al. ............... 370/241
2013/0316700 A1* 11/2013 Beale ............... H04W 72/082
                                                    455/423
2013/0343336 A1* 12/2013 Bai ............... 370/329

FOREIGN PATENT DOCUMENTS

| JP | 2010-178237 A | 8/2010 |
| JP | 2011-045118 A | 3/2011 |
| JP | 2011-066874 A | 3/2011 |
| WO | 2010047725 A1 | 4/2010 |
| WO | WO 2012/147198 A1 | 11/2012 |

OTHER PUBLICATIONS

Japanese Office Action issued on Oct. 20, 2015 in patent application No. 2013548166.

* cited by examiner

RADIO BASE STATION, COMMUNICATION CONTROL METHOD OF RADIO BASE STATION AND COMPUTER PROGRAM

TECHNICAL FIELD

The present disclosure relates to a radio base station, a communication control method of a radio base station, and a computer program.

BACKGROUND ART

With widespread use of data communication terminals of the UMTS (Universal Mobile Telecommunications System) scheme or LTE (Long Term Evolution) scheme, data communication traffic is increasing rapidly. Particularly measures for indoor data communication traffic, which makes up a large proportion thereof, are urgently needed.

An indoor low-power base station (femtocell) connects to the Internet or an operator's core network via a broadband line (hereinafter, a BB line) such as ADSL (Asymmetric Digital Subscriber Line), FTTH (Fiber To The Home), and CATV. The femtocell can connect to a data communication terminal over the Internet without going through a core network and so is expected as measures for the aforementioned rapidly increasing traffic.

In addition, the femtocell is installable in the user's house or office by the user and can limit users (terminals) allowed to use to perform short-distance communication with a data communication terminal in a relatively small service area (coverage). Therefore, the femtocell provides a communication environment of excellent communication quality and high throughput.

CITATION LIST

Patent Literature

Patent Literature 1: JP 2011-45118A

Non-Patent Literature

Non-Patent Literature 1: 3GPP TR 25.967

SUMMARY OF INVENTION

Technical Problem

The service area of a femtocell overlaps with that of a macrocell. The femtocell has a mechanism to limit users (terminals) allowed to use and thus, interference is an important problem and interference avoidance between a femtocell and a macrocell operated at the same frequency is required.

Interference adjustment methods attempting to reduce interference with a macrocell or a macrocell terminal have been known. On the other hand, if, for example, a macrocell terminal away from a macrocell is located near a femtocell and the macrocell terminal has no access rights to the femtocell, the macrocell terminal needs large uplink transmission power to allow an uplink transmission wave to reach the distant macrocell and the uplink transmission wave of the macrocell terminal excessively interferes with uplink reception by the nearby femtocell so that deterioration of uplink throughput of the femtocell terminal, interruption of communication and the like could be caused. No effective means for reducing interference with a femtocell or a femtocell terminal in uplink of such data communication has been known.

For example, Patent Literature 1 discloses a technology of countermeasures against uplink interference between base stations. The technology disclosed by Patent Literature 1 is a method in which the base station whose uplink is interfered with transmits information about the radio resource that is interfered with to adjacent base stations and the base station using the radio resource changes allocation of radio resources and to realize the method as an interference avoidance method between a femtocell and a macrocell, it is necessary to transmit information about interference between the femtocell and macrocell and if a few thousand femtocells are installed in the area of the macrocell, messages of the interference information needs heavy traffic, posing a problem of imposing strains on overall communication capacities.

For example, Non-Patent Literature 1 proposes a method of controlling the permissible noise level of uplink concerning measures against uplink interference from a macrocell terminal to a femtocell in the UMTS mobile phone scheme. If, for example, the noise level permitted for uplink reception of the femtocell is raised, transmission power of uplink of the terminal serviced to the femtocell is significantly controlled so that the influence from other terminals on uplink interference can be decreased. However, measures to increase transmission power of the femtocell terminal could cause interference of uplink of the femtocell terminal with the macrocell and the macrocell terminal and the femtocell terminal may continue to increase transmission power until the maximum power of the terminal is reached, posing a problem of interfering with each other and decreasing communication capacities of the whole system.

The present disclosure is developed in view of the above problems and an object thereof is to provide a novel and improved radio base station capable of, when a terminal serviced by a base station other than a femtocell is located near the femtocell and the terminal has no access rights to the femtocell, preventing an uplink transmission wave of the terminal from interfering with uplink reception by the femtocell and easily preventing deterioration of uplink throughput of a femtocell terminal, interruption of communication and the like, a communication control method of a radio base station, and a computer program.

Solution to Problem

According to the present disclosure, there is provided a radio base station including a terminal detection unit that detects an uplink signal of a first terminal serviced by another base station, a storage unit that stores an allocation priority of a radio resource for a predetermined period, and a resource allocation unit that allocates a radio resource to a second terminal serviced by the radio base station, using the allocation priority of the radio resource stored in the storage unit. When the terminal detection unit detects the uplink signal of the first terminal, the resource allocation unit preferentially allocates a radio resource of an uplink of a high allocation priority to the second terminal while lowering an allocation priority of a radio resource estimated to be used next for the uplink by the first terminal.

According to the present disclosure, there is provided a radio base station including a terminal detection unit that detects an uplink signal of a first terminal serviced by another base station, a storage unit that stores an allocation priority of a radio resource for a predetermined period, and a resource allocation unit that allocates a radio resource to a second terminal serviced by the radio base station, using the allocation priority of the radio resource stored in the storage unit. When the terminal detection unit detects the uplink signal of the first terminal, the resource allocation unit preferentially allocates a radio resource of a downlink of a high allocation priority to the second terminal while lowering an allocation priority of a radio resource estimated to be used next for the downlink by the first terminal.

According to the present disclosure, there is provided a communication control method of a radio base station, the communication control method including detecting an uplink signal of a first terminal serviced by another base station, storing an allocation priority of a radio resource for a predetermined period, and allocating a radio resource to a second terminal serviced by a base station, using the stored allocation priority of the radio resource. When the uplink signal of the first terminal is detected, allocating the radio resource is to preferentially allocate a radio resource of an uplink of a high allocation priority to the second terminal while lowering an allocation priority of a radio resource estimated to be used next for the uplink by the first terminal.

According to the present disclosure, there is provided a communication control method of a radio base station including detecting an uplink signal of a first terminal serviced by another base station, storing an allocation priority of a radio resource for a predetermined period, and allocating a radio resource to a second terminal serviced by a radio base station, using the stored allocation priority of the radio resource. When the uplink signal of the first terminal is detected, allocating the radio resource is to preferentially allocate a radio resource of a downlink of a high allocation priority to the second terminal while lowering an allocation priority of a radio resource estimated to be used next for the downlink by the first terminal.

According to the present disclosure, there is provided a computer program causing a computer to execute detecting an uplink signal of a first terminal serviced by another base station, storing an allocation priority of a radio resource for a predetermined period, and allocating a radio resource to a second terminal serviced by a radio base station, using the stored allocation priority of the radio resource. When the uplink signal of the first terminal is detected, allocating the radio resource is to preferentially allocate a radio resource of an uplink of a high allocation priority to the second terminal while lowering an allocation priority of a radio resource estimated to be used next for the uplink by the first terminal.

According to the present disclosure, there is provided a computer program causing a computer to execute detecting an uplink signal of a first terminal serviced by another base station, storing an allocation priority of a radio resource for a predetermined period, and allocating a radio resource to a second terminal serviced by a radio base station, using the stored allocation priority of the stored radio resource. When the uplink signal of the first terminal is detected, allocating the radio resource is to preferentially allocate a radio resource of a downlink of a high allocation priority to the second terminal while lowering an allocation priority of a radio resource estimated to be used next for the downlink by the first terminal.

Advantageous Effects of Invention

According to the present disclosure, as described above, a novel and improved radio base station capable of, when a terminal serviced from a base station other than a femtocell is located near the femtocell and the terminal has no access rights to the femtocell, preventing an uplink transmission wave of the terminal from interfering with uplink reception by the femtocell and easily preventing deterioration of uplink throughput of a femtocell terminal, interruption of communication and the like, a communication control method of a radio base station, and a computer program can be provided.

DESCRIPTION OF EMBODIMENTS

Hereinafter, preferred embodiments of the present disclosure will be described in detail with reference to the appended drawings. Note that, in this specification and the appended drawings, elements that have substantially the same function and structure are denoted with the same reference signs, and repeated explanation is omitted.

The description will be provided in the order shown below:
<1. Conventional Technology and Problems Thereof>
<2. An Embodiment of Present Disclosure>
[Overall Configuration of Data Communication System]
[Operation of Data Communication System]
<3. Conclusion>

1. CONVENTIONAL TECHNOLOGY AND PROBLEMS THEREOF

First, before starting to describe a preferred embodiment of the present disclosure in detail, the conventional technology and problems thereof will be described.

Figure 1:
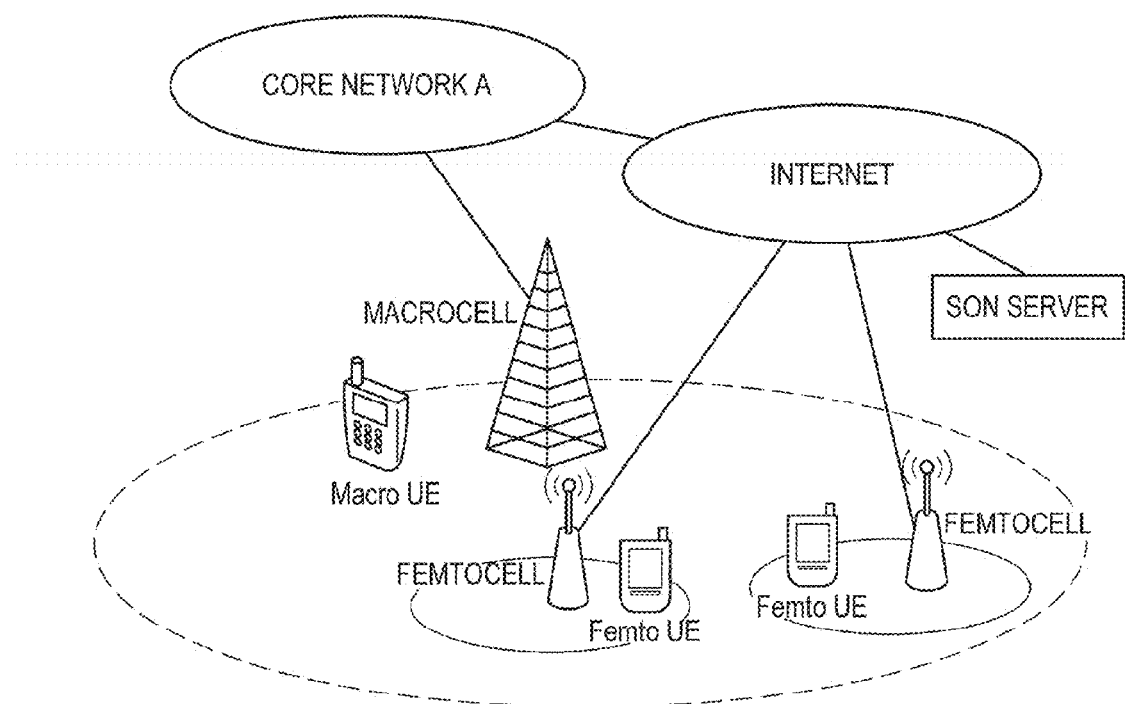
FIG. 1 is an explanatory view showing a configuration example of a general communication system.

FIG. 1 is an explanatory view showing a configuration example of a general communication system. The Internet and a core network A are connected to each other and a macrocell is connected to the core network A and femtocells are connected to the Internet. In FIG. 1, a macrocell terminal (Macro UE) communicating with the macrocell of the core network A and femtocell terminals (Femto UE) communicating with femtocells are illustrated.

Figure 2:
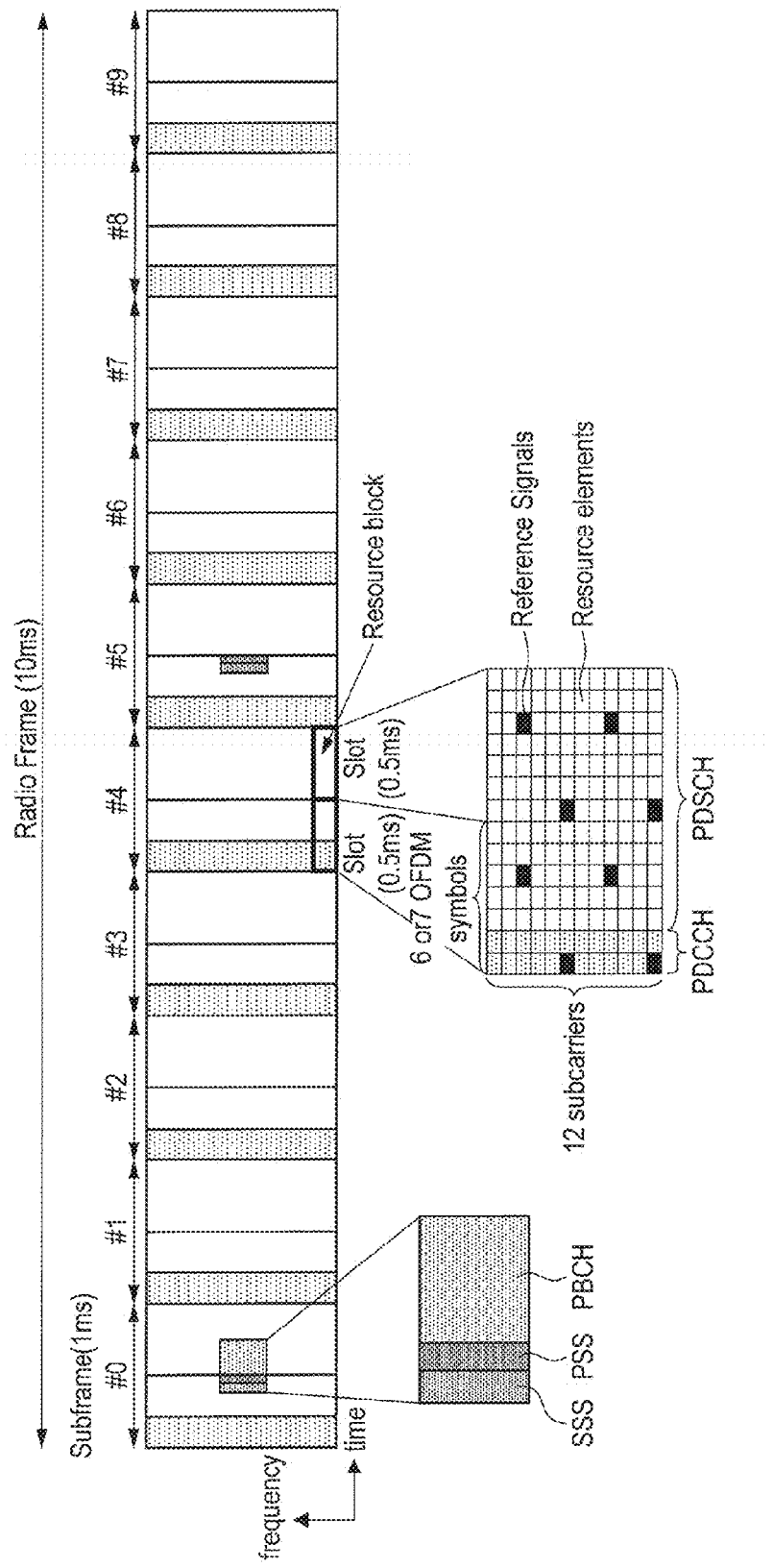
FIG. 2 is an explanatory view showing an example of a frame format of a downlink signal in the frequency division multiplexing (FDD) LTE scheme.

FIG. 2 is an explanatory view showing an example of a frame format of a downlink signal in the frequency division multiplexing (FDD) LTE scheme.

Physical channels and signals of downlink transmitted by a base station of the LTE scheme to a terminal include a physical down shared channel (PDSCH) to transmit data for individual users, a physical down control channel (PDCCH) to transmit control information of downlink, a physical broadcasting channel (PBCH) to transmit system information needed for a terminal to access a network, a physical hybrid ARQ information channel (PHICH) to transmit an acknowledgement indicating whether to retransmit a transport block to a terminal, a physical control format information channel (PCFICH) to transmit information needed for PDCCH decoding, a downlink reference signal (Reference Signal) used by the terminal to estimate the channel of downlink to perform synchronous detection in a variable down physical channel, and a primary synchronous signal (PSS) and a secondary synchronous signal (SSS) to help a terminal search for a cell to be able to detect a physical layer cell ID (PCI) of the cell, the physical hybrid ARQ information channel (PHICH) and the physical control format information channel (PCFICH) are allocated to the first OFDM symbol of each subframe, and the physical down control channel (PDCCH) is allocated to remaining resource elements of the control area (first three OFDM symbols of each subframe).

A terminal detects PCI and frame timing by detecting the primary synchronous signal (PSS) and the secondary synchronous signal (SSS) using a signal sequence corresponding to the physical layer cell ID (PCI) allocated to individual base stations. Because the arrangement of PSS and SSS in a radio frame is different between the frequency division multiplexing (FDD) and time division multiplexing (TDD), the terminal can also determine which of the FDD system and TDD system is used by the searched cell, simultaneously with the detection of PSS and SSS. A synchronization signal is always arranged in the band of six resource blocks in the center regardless of the service bandwidth to easily enable a cell search even if the system bandwidth of a base station is unknown.

System information is mapped to the physical broadcasting channel (PBCH) and the physical down shared channel (PDSCH). The master information block (MIB) such as the cell bandwidth of downlink, number of transmitting antennas, and structure of control information is mapped to PBCH and the system information block (SIB) such as information indicating whether a terminal can be present in the cell, the bandwidth of uplink, random access channel parameters, parameters of uplink transmission power control, information about cell reselection, and information about neighboring cells is mapped to PDSCH. The terminal that have detected frame timing decodes MIB mapped to PBCH to know the cell bandwidth of downlink from MIB, receives PDCCH to know the position of the resource block of PDSCH to which SIB is allocated, and SIB information is decoded from the corresponding PDSCH.

FIG. 2 shows an example in which a cell specific reference signal (CRS) is inserted into the first to third OFDM symbols in the slot at intervals of six subcarriers in the frequency region, but the position of the start subcarrier is different depending on the physical layer cell ID (PCI). When transmitted by a plurality of downlink antennas, an offset is added to the OFDM symbols and subcarriers for each antenna port so that the reference signal for each antenna should not overlap.

The terminal knows the position of the resource element into which the cell specific reference signal (CRS) to be detected is inserted from the detected PCI and the number of transmitting antennas and measures the intensity of reception thereof to be able to periodically report the measured value to the base station.

In the LTE scheme, radio resources used by the terminal are allocated by the base station in resource block units for both of the downlink and uplink.

The resource allocation (scheduling information) of downlink to each terminal is notified by PDCCH of the same subframe of the allocated resource. The scheduling information contains, in addition to the position of the allocated resource block, the modulation and coding method, hybrid ARQ processing information and the like. The base station assigns the terminal ID to each terminal to recognize each terminal to be serviced. The scheduling information uses the terminal ID to perform a cyclic redundancy check (CRC) operation and the terminal can decode only scheduling information needed for the terminal without decoding scheduling information addressed to other terminals by decoding only information whose CRC checking is successful using the terminal ID of the terminal.

Figure 3:
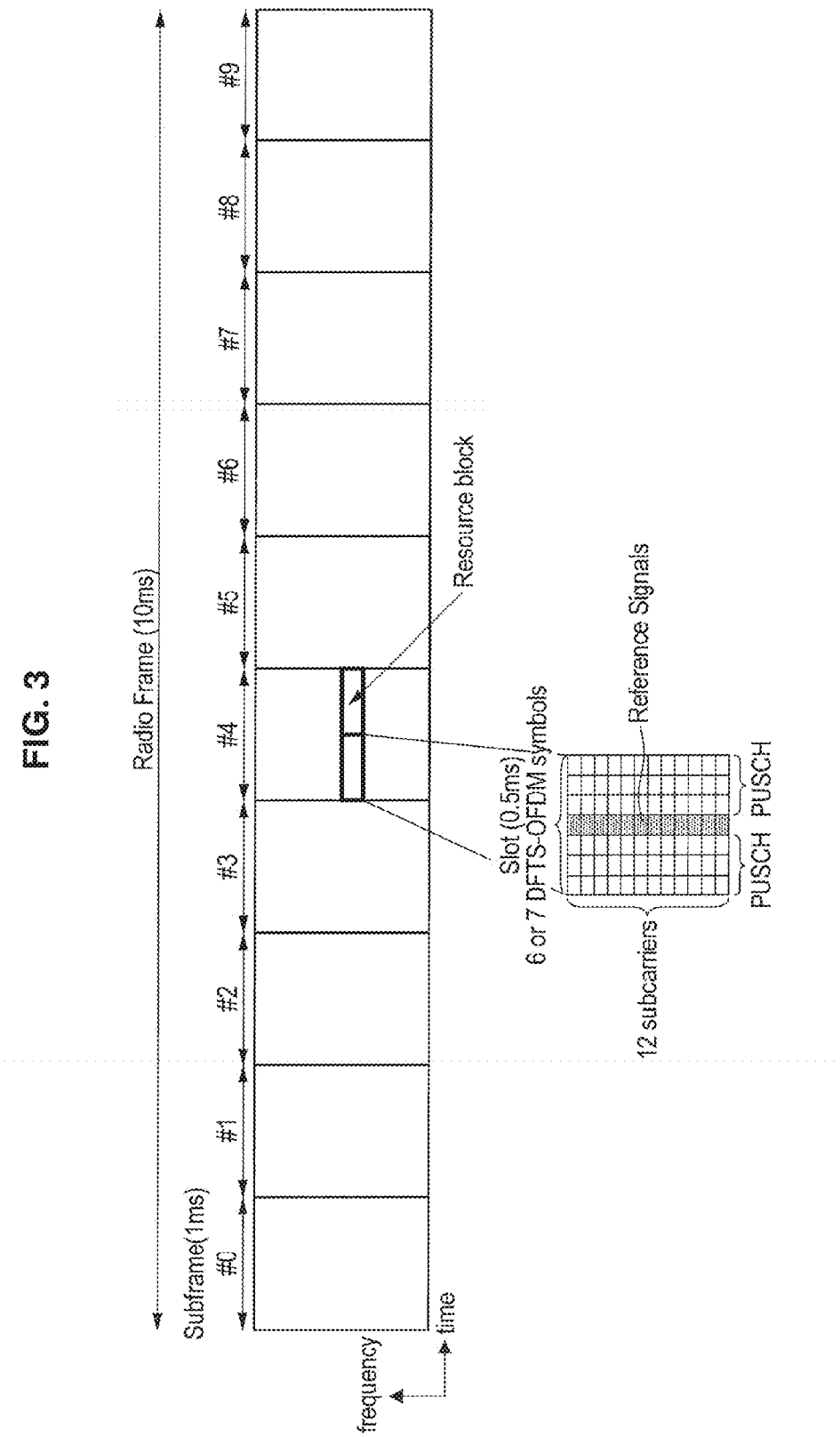
FIG. 3 is an explanatory view showing an example of the frame format of an uplink signal in the frequency division multiplexing (FDD) LTE scheme.

FIG. 3 is an explanatory view showing an example of the frame format of an uplink signal in the frequency division multiplexing (FDD) LTE scheme.

Physical channels and signals of uplink transmitted by a terminal of the LTE scheme to a base station include a physical up shared channel (PUSCH), transmission of a hybrid ARQ acknowledgment to indicate whether to retransmit a downlink transport block, a resource request for uplink data transmission, a physical up control channel (PUCCH) used to report channel conditions and the like of downlink, a physical random access channel (PRACH) used for random access, and an uplink reference signal (DRS) used by the base station to perform synchronous detection.

The resource allocation (scheduling information) of uplink to each terminal is notified by the physical down control channel (PDCCH) of the subframe four subframes before the allocated resource. The scheduling information contains, in addition to the position of the allocated resource block, frequency hopping information of uplink, the modulation and coding method, new data display used to clear a buffer by initial transmission, and transmission power control bits for the physical up shared channel (PUSCH). The scheduling information uses the terminal ID to perform a cyclic redundancy check (CRC) operation and the terminal can decode only scheduling information needed for the terminal without decoding scheduling information addressed to other terminals by decoding only information whose CRC checking is successful using the terminal ID of the terminal.

In the transmission of PUSCH, a reference signal (DRS) provided with a reference signal sequence that is different from cell to cell and a phase rotation that is different from terminal to terminal is transmitted by using the fourth symbol of each slot.

The service area of a femtocell overlaps with that of a macrocell. The femtocell has a mechanism to limit users (terminals) allowed to use and thus, interference is an important problem and interference avoidance between a femtocell and a macrocell operated at the same frequency is required.

Figure 4:
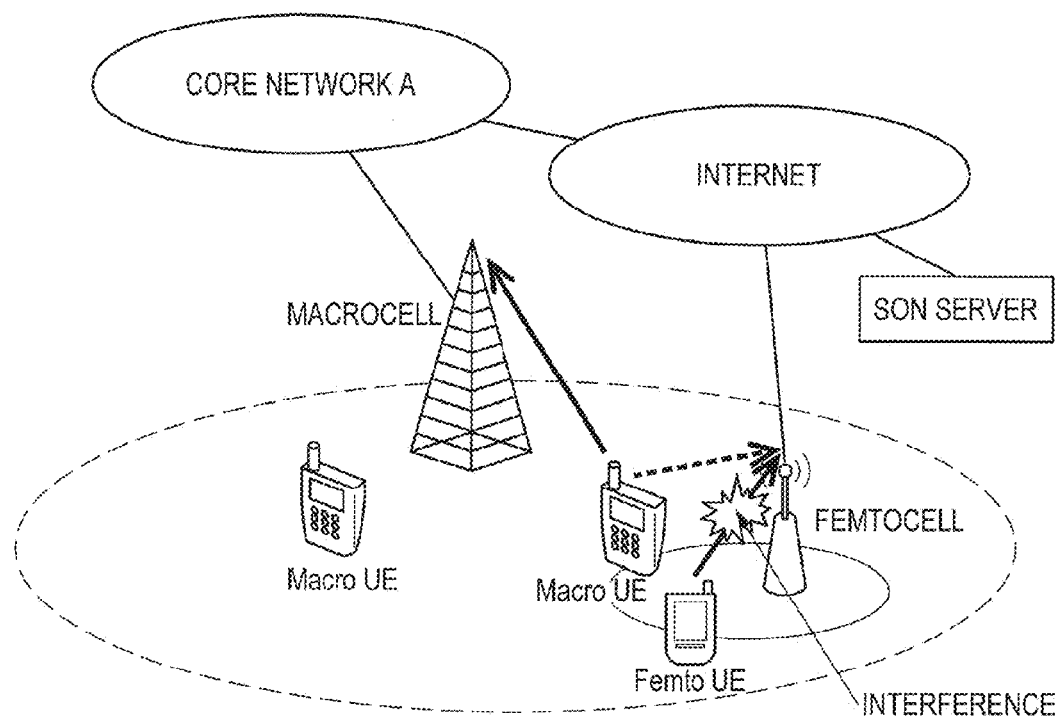
FIG. 4 is an explanatory view showing a state in which uplink interference from a macrocell terminal to a femtocell occurs.

If, for example, a terminal (macrocell terminal) serviced by a macrocell not permitted to access a femtocell is located near the femtocell, the macrocell terminal is not permitted to access the femtocell even if a downlink signal from the femtocell becomes stronger than a downlink signal from the macrocell and the downlink signal transmitted by the femtocell becomes interference noise for the macrocell terminal, leading to deterioration of communication quality such as lower reception throughput of the macrocell terminal and possibly interruption of communication. On the other hand, the downlink signal transmitted by the macrocell becomes interference noise for the terminal (femtocell terminal) serviced by the femtocell. FIG. 4 is an explanatory view showing a state in which uplink interference from a macrocell terminal to a femtocell occurs.

As a method of reducing interference between a femtocell and a macrocell, for example, the interference adjustment method of the LTE scheme is proposed in 3GPP TR 36.921. As an interference adjustment method of a downlink control channel, a timing shift of the symbol level of the control channel is proposed. As an interference adjustment method of a downlink data channel, methods of frequency reuse and transmission power control of a femtocell are proposed. As an interference adjustment method of an uplink control channel, an allocation method in the frequency domain is proposed. As an interference adjustment method of an uplink data channel, a transmission power control method of a femtocell terminal is proposed. The above interference adjustment methods are all methods of attempting to reduce interference with a macrocell or macrocell terminal.

As described above, if, for example, a macrocell terminal away from a macrocell is located near a femtocell and the macrocell terminal has no access rights to the femtocell, the macrocell terminal needs large uplink transmission power to allow an uplink transmission wave to reach the distant macrocell and the uplink transmission wave of the macrocell terminal excessively interferes with uplink reception by the nearby femtocell so that deterioration of uplink throughput of the femtocell terminal, interruption of communication and the like could be caused. No effective means for reducing interference with a femtocell or a femtocell terminal in uplink of such data communication has been known.

Figure 5:
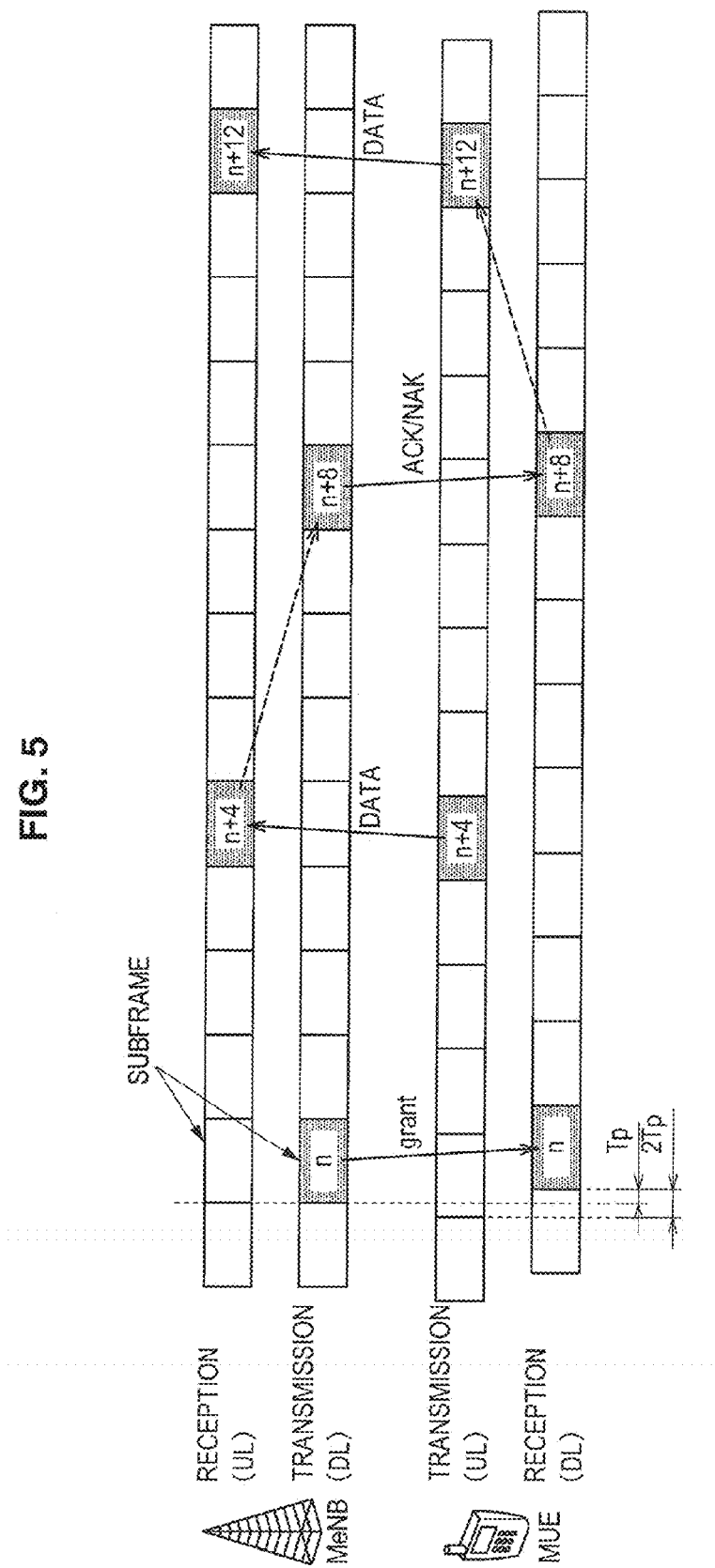
FIG. 5 is an explanatory view showing a timing example of a hybrid ARQ acknowledgement.

FIG. 5 is an explanatory view showing transmission data of a terminal with an uplink transport block in the frequency division multiplexing (FDD) LTE scheme and a timing example of a hybrid ARQ acknowledgment notifying the terminal from a base station through downlink whether to retransmit the transport block of the terminal.

As shown in FIG. 5, scheduling information of the uplink is transmitted to the terminal by the physical down control channel (PDCCH) transmitting downlink control information using the n-th subframe and the terminal receives the data in the same subframe n after a transmission delay Tp. Because there is the same transmission delay between terminal transmission and base station reception, there is a shift of 2*Tp between a transmission subframe and a reception subframe of the terminal.

The physical up shared channel (PUSCH) carrying uplink transport blocks is permitted for the subframe four subframes after the subframe by which scheduling information is transmitted. The terminal transmits transport block data to the base station by the (n+4)-th subframe using PUSCH and the base station receives the data through the (n+4)-th subframe.

The base station transmits a hybrid ARQ acknowledgement to the terminal by the (n+8)-th subframe of downlink using the physical hybrid ARQ information channel (PHICH). If a negative acknowledgement (NAK) is transmitted, the (n+12)-th subframe four subframes thereafter is used for retransmission. The resource block used for retransmission is, if not explicitly specified by PDCCH, the same as that used for the initial transmission. In the uplink, therefore, the subframes used for retransmission are known in advance and the same resource block is used.

Figure 6:
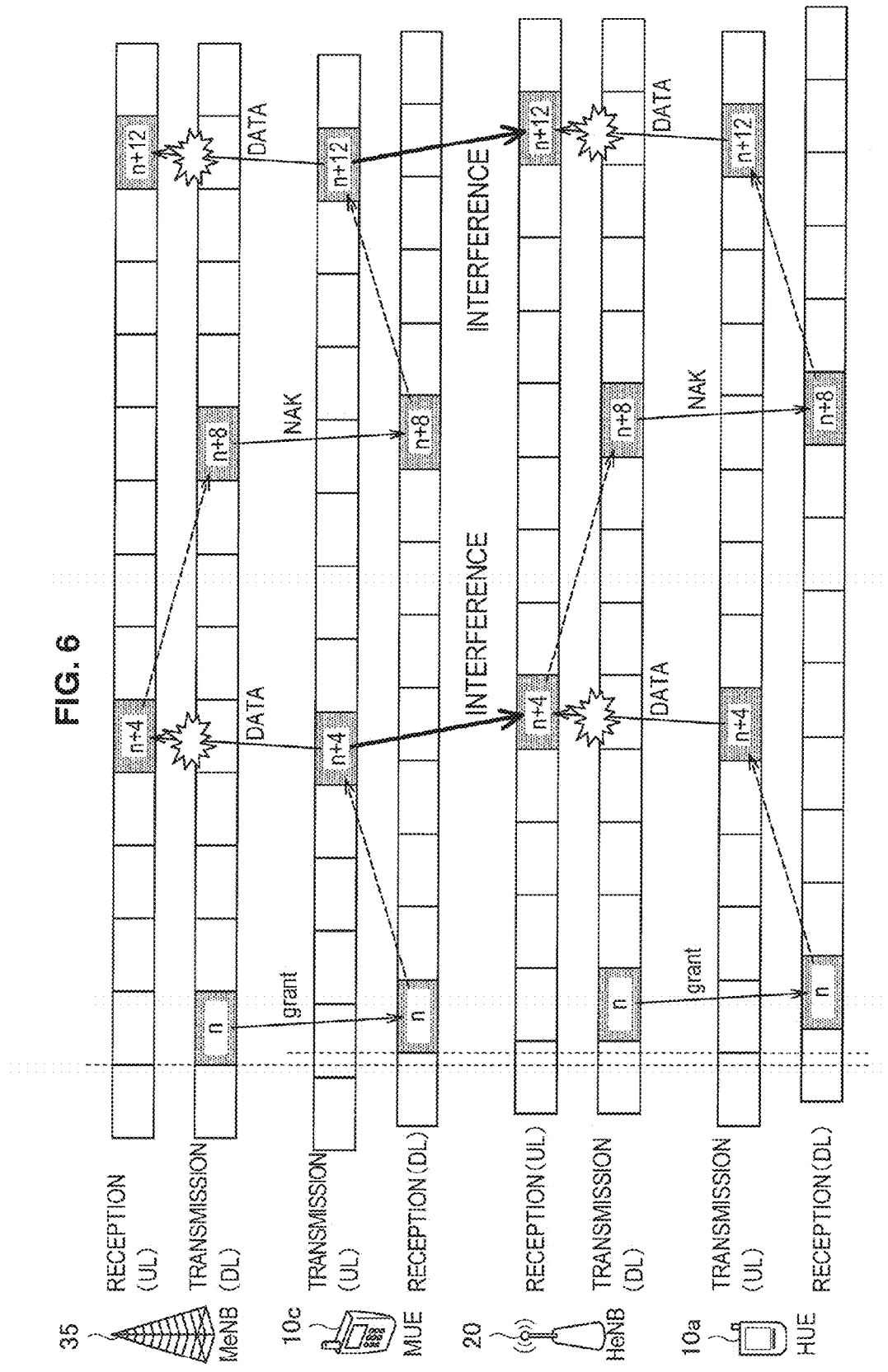
FIG. 6 is an explanatory view showing an example of uplink interference between a macrocell and a femtocell in the frequency division multiplexing (FDD) LTE scheme.

FIG. 6 is an explanatory view showing an example of uplink interference between a macrocell and a femtocell in the frequency division multiplexing (FDD) LTE scheme. If a macrocell terminal away from a macrocell is located near a femtocell and the macrocell terminal has no access rights to the femtocell, the macrocell terminal needs large uplink transmission power to allow an uplink transmission wave to reach the distant macrocell and the uplink of the femtocell terminal using the same resource block as the uplink transmission wave of the macrocell terminal is excessively interfered with. Conversely, with deterioration of uplink communication quality of the femtocell, the control to increase transmission power of the femtocell terminal arises, causing interference with uplink to the macrocell. Such a state could mutually cause the macrocell terminal and the femtocell terminal to retransmit, leading to lower throughput of both of the macrocell terminal and the femtocell terminal.

Thus, in a preferred embodiment of the present disclosure described below, a femtocell base station capable of, when a terminal serviced by a base station other than a femtocell is located near the femtocell and the terminal has no access rights to the femtocell, preventing an uplink transmission wave of the terminal from interfering with uplink reception by the femtocell and easily preventing deterioration of uplink throughput of a femtocell terminal, interruption of communication and the like will be described.

2. AN EMBODIMENT OF PRESENT DISCLOSURE

Overall Configuration of Data Communication System

Figure 7:
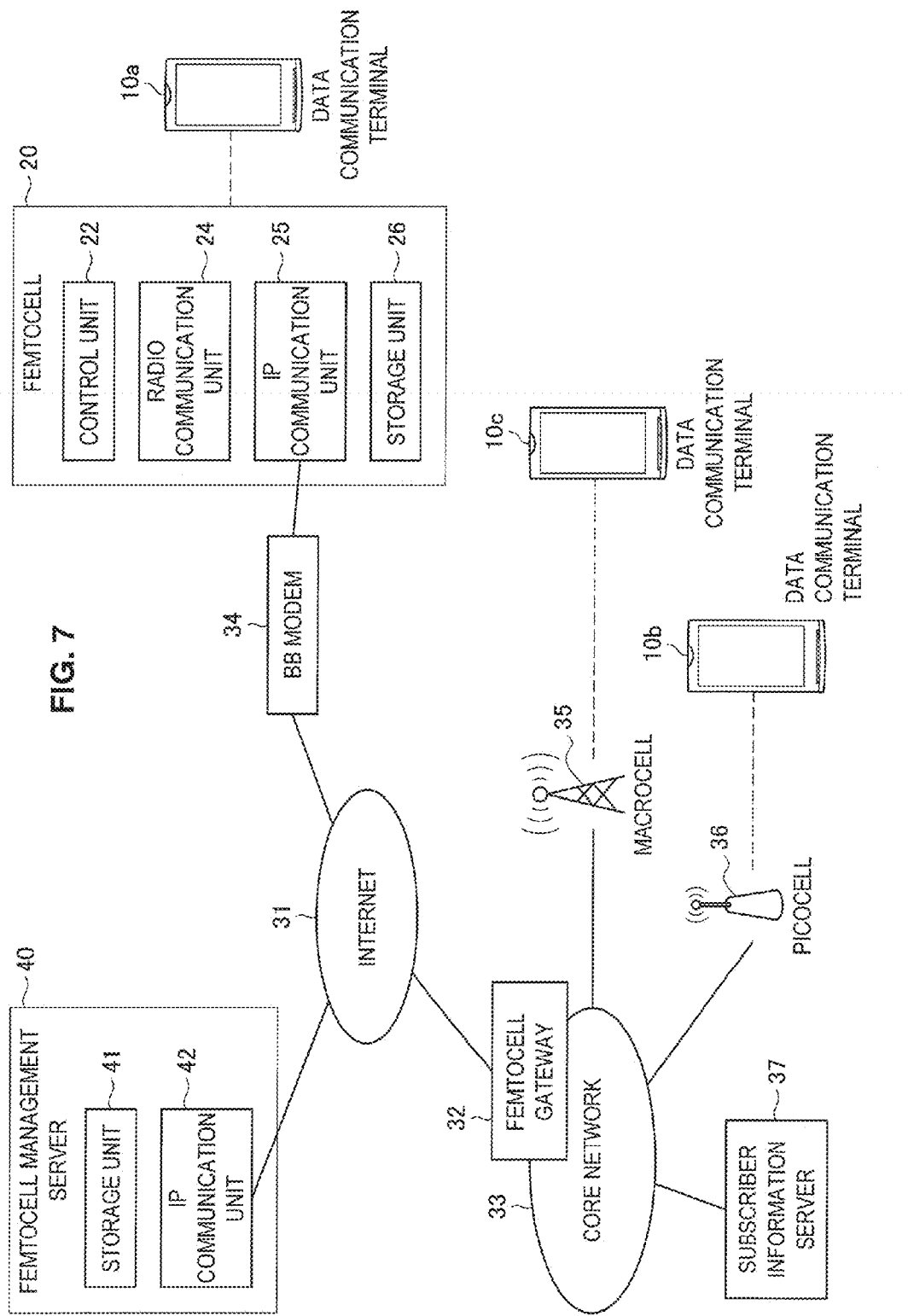
FIG. 7 is an explanatory view showing an overall configuration of a data communication system according to an embodiment of the present disclosure.

FIG. 7 is an explanatory view showing an overall configuration of a data communication system according to an embodiment of the present disclosure. Hereinafter, an overall configuration of the data communication system according to an embodiment of the present disclosure will be described using FIG. 7.

A data communication system 1 shown in FIG. 7 is a data communication system including a femtocell. As shown in FIG. 7, the data communication system 1 according to an embodiment of the present disclosure includes data communication terminals 10a, 10b, 10c, the femtocell (indoor small base station) 20, an Internet 31, a femtocell gateway 32, a core network 33, a BB line modem 34, the macrocell (outdoor base station) 35, a picocell 36, a subscriber information server 37, and a femtocell management server 40.

The macrocell (outdoor base station) 35 is a base station that covers a relatively wide range of the radius of a few hundred meters to a few tens of kilometers. The femtocell (indoor small base station) 20 is a base station of low transmission power whose cell radius is a few tens of meters. The femtocell 20 can be used by being installed indoors where a radio wave of the macrocell is hardly received. The femtocell 20 is connected to the core network 33 via, for example, the BB line modem 34, a BB line, the Internet 31, and the femtocell gateway 32. The communication interface between the femtocell 20 and the femtocell gateway 32 is defined by a standard interface, for example, Iuh (3GPP TS 25.467).

The femtocell 20 includes a radio communication unit 24 that performs radio communication the data communication terminal 10a, an IP communication unit 25 that performs wire communication with the femtocell management server 40 or the femtocell gateway 32, the control unit 22 that exercises frequency switching control of the radio communication unit to measure downlink radio waves of surrounding base stations and measurement control of the reference signal, and a storage unit 26 that stores the address of the femtocell management server 40, the address of the femtocell gateway 32, ID (Allowed CSG List) of terminals allowed to access the femtocell 20. Radio parameters of the femtocell 20 such as the carrier frequency and maximum transmission power are also stored in the storage unit 26.

The femtocell management server 40 is a server used for startup preparations and maintenance of a femtocell handled by one operator and includes an IP communication unit 42 that performs communication with a plurality of femtocells and a storage unit 41. The physical cell ID, carrier frequency, neighboring cell information, position information and the like used by femtocells managed by the femtocell management server 40 are stored in the storage unit 41. FIG. 7 shows only the one femtocell management server 40 operated by some operator (for example, Operator A), but other operators also operate similar servers. In the present disclosure, femtocells managed by a plurality of operators may be managed by one femtocell management server.

The femtocell 20 operated by Operator A is connected to the core network 33 via the femtocell gateway 32. Similarly, the macrocell 35 is a macrocell operated by Operator A and the picocell 36 is a picocell operated by Operator A. Operator A operates a downlink carrier frequency A and the macrocell 35, the picocell 36, and the femtocell 20 transmit the carrier frequency A in the downlink.

The data communication terminals 10a, 10b, 10c are all terminals under contract with Operator A operating the core network 33, the data communication terminal 10a is located indoors where the femtocell 20 can be used, the data communication terminal 10b performs communication via the picocell 36, and the data communication terminal 10c performs communication via the macrocell 35.

A downlink signal transmitted by the macrocell 35 is interference noise for the data communication terminal 10b. Thus, interference adjustments are made between the macrocell 35 and the picocell 36 and the picocell 36 is notified of information of ABS used by the macrocell 35. The picocell 36 transmits an important downlink signal to the data communication terminal 10b by allocating to a downlink subframe of the picocell 36 corresponding to the time of the subframe specified as ABS in the macrocell 35.

When the femtocell 20 is turned on, the femtocell 20 searches radio waves of surrounding base stations including the macrocell 35 and measures reception power to receive and acquire broadcasting information. The femtocell 20 also connects to the femtocell management server 40 to acquire information about base stations positioned around the position information registered in advance and checks the position against measurement results by the femtocell 20 to select optimum radio parameters that do not overlap with those used by surrounding base stations.

A downlink signal transmitted by the femtocell 20 is interference noise for the data communication terminal 10c and the femtocell periodically decides the maximum transmission power of the femtocell such that interference is minimized according to measurement results of intensity of reference signals from surrounding base stations.

In the foregoing, the overall configuration of the data communication system according to an embodiment of the present disclosure has been described using FIG. 7. Next, the configuration of the control unit 22 contained in the femtocell 20 according to an embodiment of the present disclosure will be described.

Figure 8:
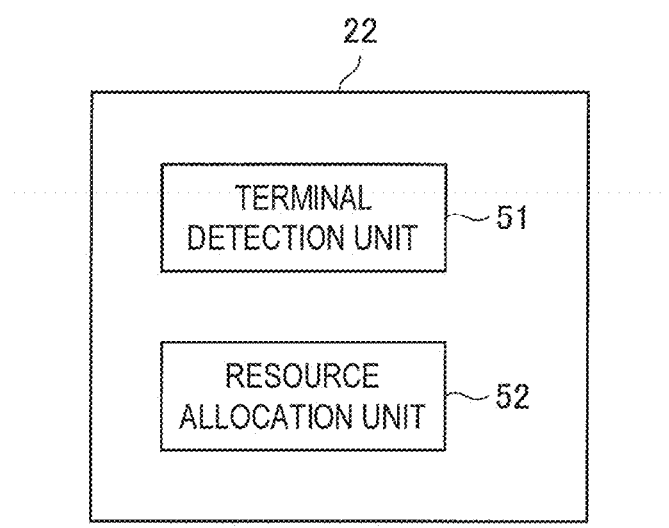
FIG. 8 is an explanatory view showing the configuration of a control unit 22 contained in a femtocell 20 according to an embodiment of the present disclosure.

FIG. 8 is an explanatory view showing the configuration of the control unit 22 contained in the femtocell 20 according to an embodiment of the present disclosure. Hereinafter, the configuration of the control unit 22 contained in the femtocell 20 according to an embodiment of the present disclosure will be described using FIG. 8.

As shown in FIG. 8, the control unit 22 includes a terminal detection unit 51 and a resource allocation unit 52. The terminal detection unit 51 detects an uplink signal of the data communication terminal 10c serviced by the macrocell 35 as another base station. The resource allocation unit 52 allocates radio resources to the data communication terminal 10a serviced by the femtocell 20 using allocation priorities of radio resources stored in the storage unit 26. When the terminal detection unit 51 detects an uplink signal of the data communication terminal 10c, the resource allocation unit 52 preferentially allocates a radio resource of uplink or downlink of a high allocation priority to the data communication terminal 10a while lowering an allocation priority to the radio resource estimated to be used next by the data communication terminal 10c for uplink or downlink.

In the foregoing, the configuration of the control unit 22 contained in the femtocell 20 according to an embodiment of the present disclosure has been described using FIG. 8. The control unit 22 can have the function configuration as shown in FIG. 8 by, for example, a computer program stored in the storage unit 26 being read and executed by the control unit 22.

Next, the operation of a data communication system including the femtocell 20 according to an embodiment of the present disclosure will be described.

[Operation of Data Communication System]

In the LTE scheme, for example, a reference signal sequence that is different from cell to cell is used as a decoding reference signal (DRS) of uplink arranged as the fourth symbol of PUSCH and a phase rotation that is different from terminal to terminal is provided to recognize each terminal. The femtocell 20 can detect the data communication terminal 10c as a macrocell terminal by detecting the intensity of an uplink signal containing DRS using a reference signal sequence other than the reference signal sequence used by the femtocell 20. If, for example, the femtocell 20 receives an uplink signal larger than a preset threshold and DRS contained in the uplink signal is used by the macrocell 35, uplink resources are allocated to the data communication terminal 10a as a femtocell terminal as described below.

As an example, if, for example, the femtocell 20 in the LTE scheme detects an uplink of the data communication terminal 10c as a macrocell terminal, uplink resources are allocated to the data communication terminal 10a by a method by which a lower allocation priority is given to uplink resources of the data communication terminal 10a as a femtocell terminal in the subframe eight subframes after the detected subframe.

Figure 9:
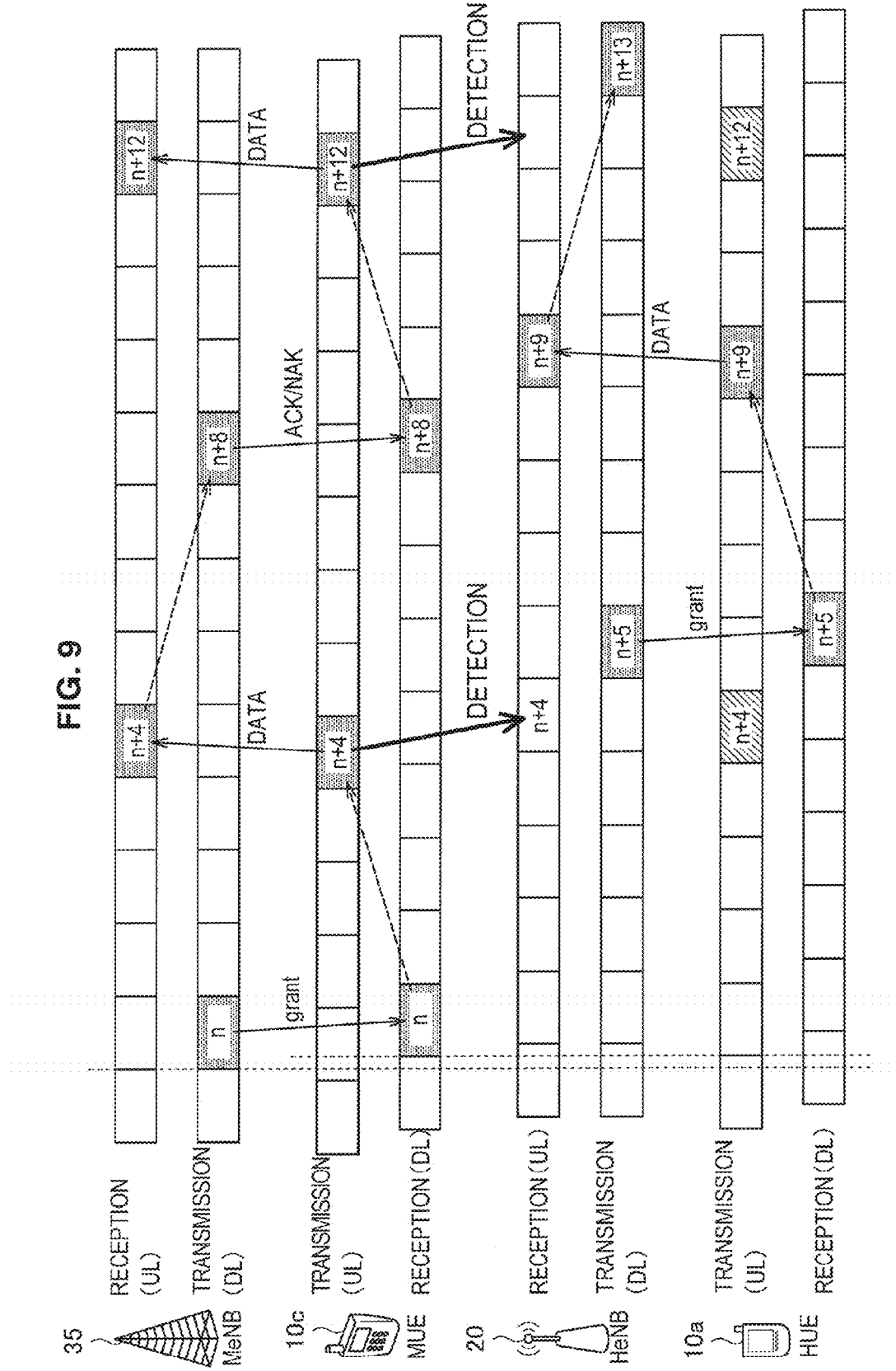
FIG. 9 is an explanatory view showing an example of a resource allocation method of uplink of the femtocell 20 according to an embodiment of the present disclosure.

FIG. 9 is an explanatory view showing an example of the resource allocation method of uplink of the femtocell 20 according to an embodiment of the present disclosure. The data communication terminal 10c as a macrocell terminal obtains permission of uplink allocation in the n-th subframe from the macrocell 35 and transmits a transport block by the (n+4)-th subframe. The data communication terminal 10c is away from the macrocell 35 and if the femtocell 20 is closer, radio interference becomes worse and the frequency with which data retransmission is requested from the macrocell 35 is expected to be high.

A negative acknowledgement (NAK) as a hybrid ARQ acknowledgement is transmitted by the (+8)-th subframe from the macrocell 35 to the data communication terminal 10c and the data communication terminal 10c transmits retransmission data by the (n+12)-th subframe of uplink.

When uplink transmission is requested from the data communication terminal 10a as a femtocell terminal, the femtocell 20 permits resource allocation of uplink in the (n+5)-th subframe and the data communication terminal 10a transmits by the (n+9)-th subframe. This is because the femtocell 20 does not detect an uplink of the data communication terminal 10a in the (n+1)-th subframe and allocation priorities are not low.

When the femtocell 20 detects an uplink of the data communication terminal 10c as a macrocell terminal in the (n+4)-th subframe, the femtocell 20 lowers an allocation priority of the data communication terminal 10a in the (n+8)-th subframe so that allocation permission of uplink is not granted to prevent uplink allocation to the data communication terminal 10a as a femtocell terminal in the (n+12)-th subframe.

That is, when the femtocell 20 allocates uplink resources of the data communication terminal 10a as a femtocell terminal, resources of the subframe, which are four subframes before, in which an uplink of the data communication terminal 10c as a macrocell terminal is not detected are preferentially allocated.

If uplink transmission by the data communication terminal 10c as a macrocell terminal is successively performed by a plurality of subframes and there is no subframe preferentially allocated by the femtocell 20, the femtocell 20 may allocate, among a plurality of resource blocks in the subframes, resource blocks other than resource blocks used for uplink transmission of the macrocell.

Because the probability of retransmission using the same resource blocks as those in the initial transmission is high in the uplink of the data communication terminal 10c as a macrocell terminal, the femtocell 20 can probabilistically reduce interference by a method of still lowering allocation priorities of the same resource blocks as those in which uplink transmission of the data communication terminal 10c is detected.

In this manner, it becomes possible to prevent the data communication terminal 10c as a macrocell terminal and the data communication terminal 10a as a femtocell terminal from continuing to interfere with each other by lowering a priority of resource allocation so that uplink resources of the data communication terminal 10a as a femtocell terminal are not allocated to the subframe by which the macrocell 35 is expected to transmit retransmission data.

Also in the downlink, lower throughput of the macrocell 35 and the femtocell 20 can be caused by the same interference mechanism as that in the uplink.

Figure 10:
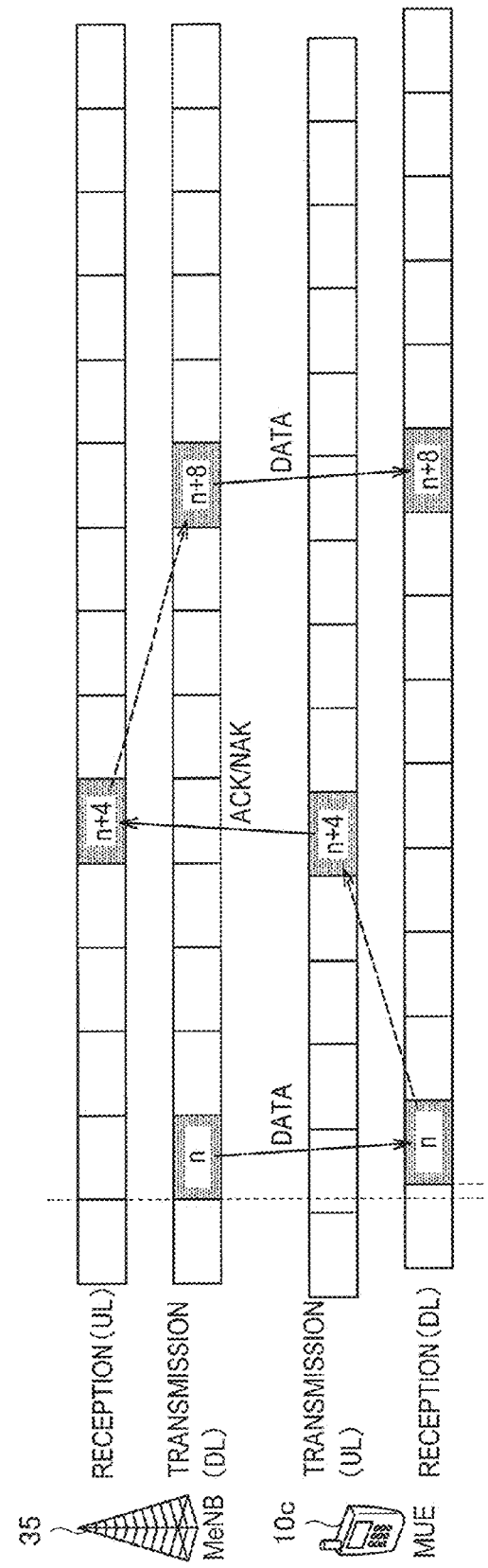
FIG. 10 is an explanatory view showing a timing example of the hybrid ARQ acknowledgement.

FIG. 10 is an explanatory view showing transmission data of a base station with a downlink transport block in the frequency division multiplexing (FDD) LTE scheme and a timing example of a hybrid ARQ acknowledgment notifying the base station through uplink whether to retransmit the transport block of the base station.

Scheduling information of the downlink from the femtocell 20 or the macrocell 35 is transmitted to the data communication terminal 10a as a femtocell terminal or the data communication terminal 10c as a macrocell terminal by the physical down control channel (PDCCH) transmitting downlink control information using the n-th subframe and the data communication terminals 10a, 10c receive the data in the same n-th subframe after a transmission delay Tp.

Because there is the same transmission delay between transmission from the data communication terminals 10a, 10c and reception by the femtocell 20 or the macrocell 35, there is a shift of 2*Tp between a transmission subframe and a reception subframe of the data communication terminals 10a, 10c. The physical down shared channel (PDSCH) carrying downlink transport blocks is transmitted to the terminals by the same subframe as the subframe by which scheduling information is transmitted and each of the data communication terminals 10a, 10c receives PDSCH in the n-th subframe.

Each of the data communication terminals 10a, 10c transmits a hybrid ARQ acknowledgement to the femtocell 20 or the macrocell 35 by the (n+4)-th subframe of uplink using the physical up shared channel (PUSCH) or the physical up control channel (PUCCH). When the hybrid ARQ acknowledgement is received, the femtocell 20 or the macrocell 35 can retransmit downlink data by the (n+8)-th subframe if necessary. Retransmission data is in principle scheduled to be retransmitted in the same manner as the initial transmission, but like the initial data, the retransmission data can also be changed in arrangement on the frequency axis or transmission form according to scheduling information.

Figure 11:
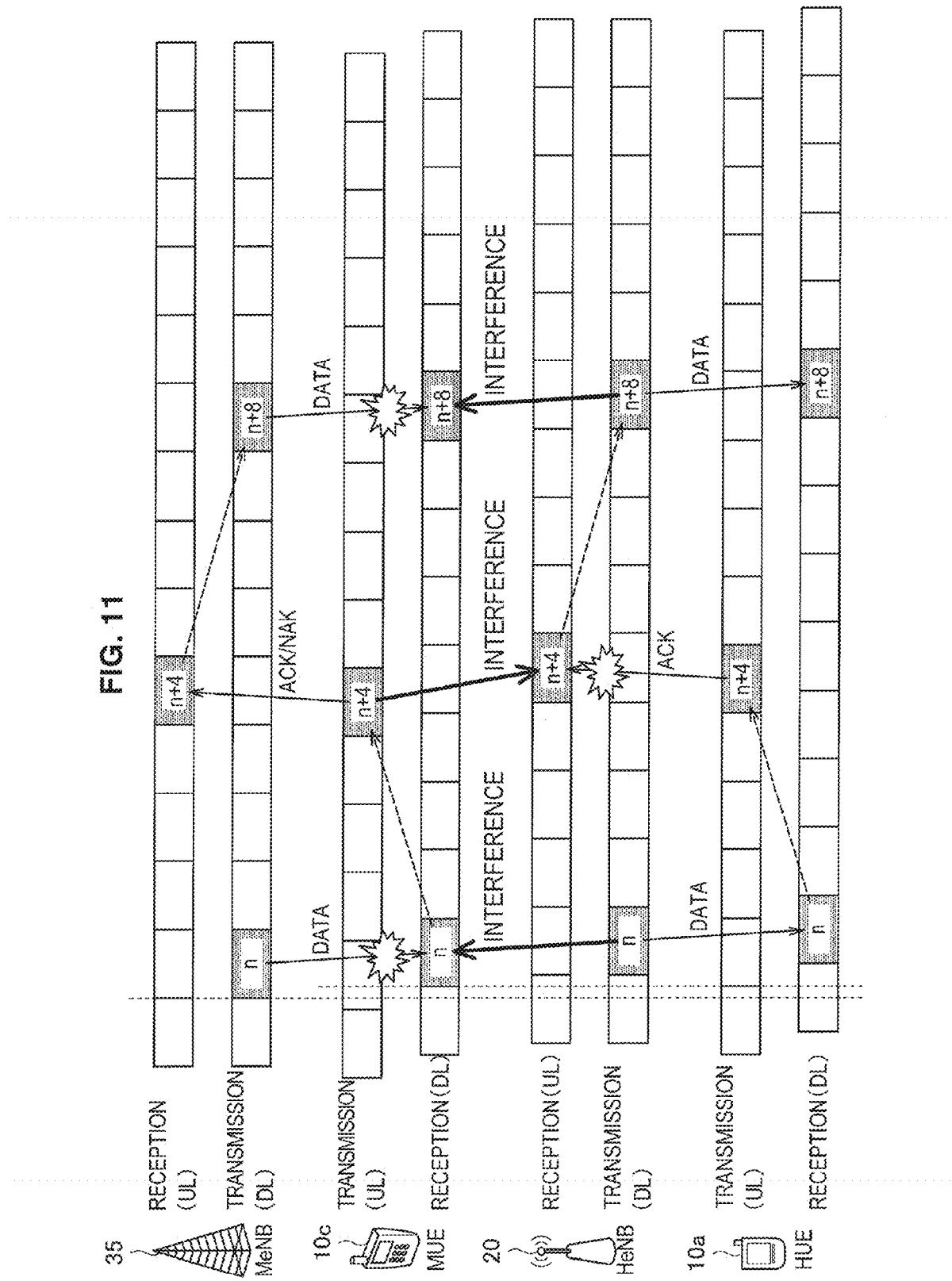
FIG. 11 is an explanatory view showing an example of downlink interference between the macrocell and femtocell in the frequency division multiplexing (FDD) LTE scheme.

FIG. 11 is an explanatory view showing an example of downlink interference between the macrocell 35 and the femtocell 20 in the frequency division multiplexing (FDD) LTE scheme. If the data communication terminal 10c as a macrocell terminal away from the macrocell 35 is located near the femtocell 20 and the data communication terminal 10c has no access rights to the femtocell 20, the reception level of a downlink signal of the femtocell 20 is expected to be high when compared with the reception level of a downlink signal of the macrocell 35 in the data communication terminal 10c.

If a resource block of the femtocell 20 overlaps with that of the subframe allocated to the downlink of the data communication terminal 10a as a femtocell terminal, the downlink of the femtocell 20 excessively interferes with the downlink of the macrocell 35, causing retransmission of downlink data of the macrocell 35.

In the subframe four subframes after the downlink is transmitted, a hybrid ARQ acknowledgement transmitted by the data communication terminal 10c as a macrocell terminal and that transmitted by the data communication terminal 10a are transmitted by the same subframe and because transmission power of the uplink of the data communication terminal 10c is high, the uplink of the femtocell 20 is excessively interfered with and the data communication terminal 10c inhibits the femtocell 20 from receiving a hybrid ARQ acknowledgement transmitted by the data communication terminal 10a, causing retransmission of downlink data of the femtocell 20.

Such a state could mutually cause the macrocell 35 and the femtocell 20 to retransmit, leading to lower throughput of both of the data communication terminal 10a and the data communication terminal 10c. An interference adjustment method by the femtocell 20 to prevent such a state from arising will be described.

If, for example, the femtocell 20 in the LTE scheme detects an uplink of the data communication terminal 10c as a macrocell terminal and the uplink is a hybrid ARQ acknowledgement, the femtocell 20 lowers an allocation priority of femtocell terminal downlink resources in the subframe four subframes after the detected subframe.

Figure 12:
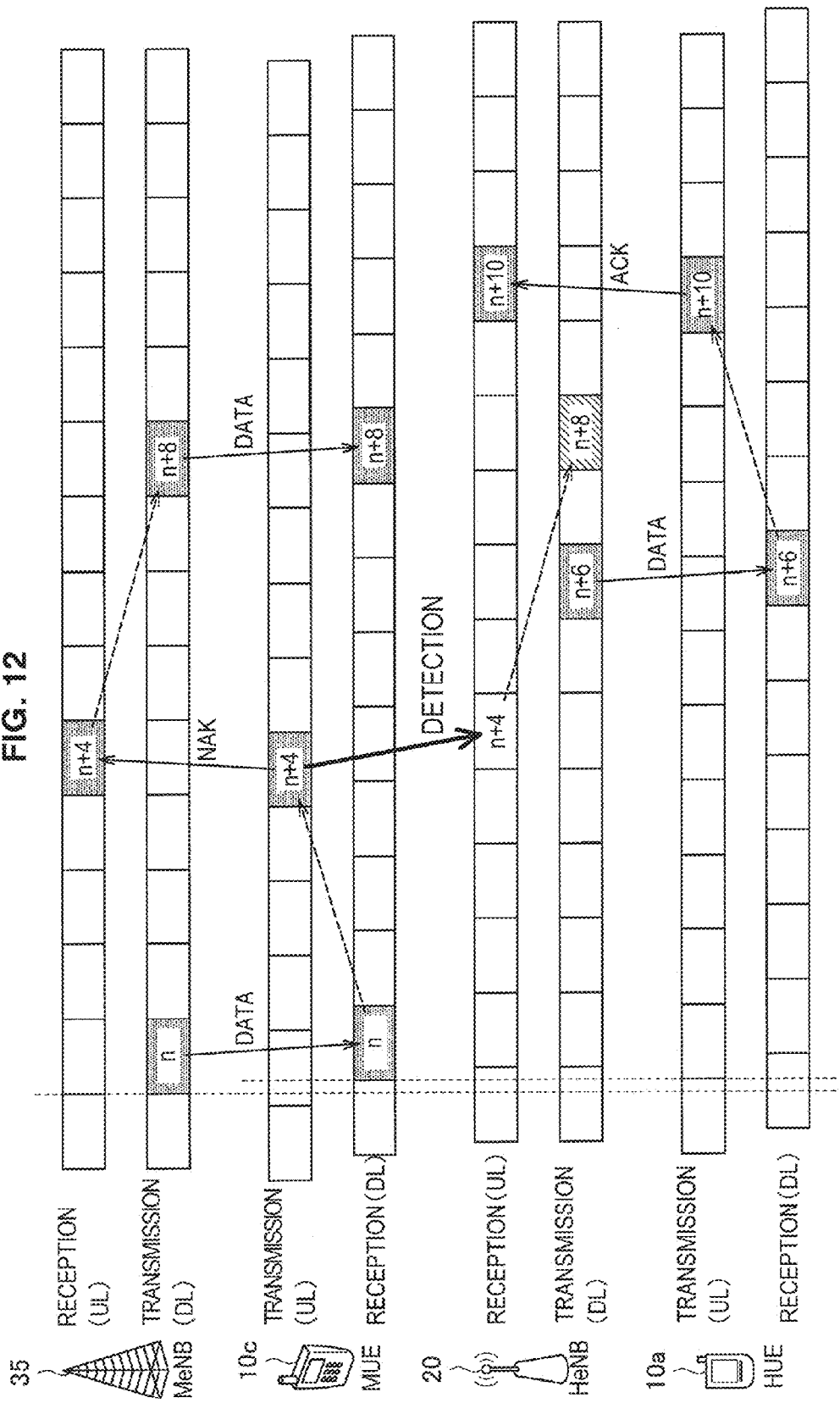
FIG. 12 is an explanatory view showing an example of the resource allocation method of downlink of the femtocell 20.

FIG. 12 is an explanatory view showing an example of the resource allocation method of downlink of the femtocell 20. It is assumed that the macrocell 35 transmits a downlink transport block to the data communication terminal 10c as a macrocell terminal by the n-th subframe.

The data communication terminal 10c is away from the macrocell 35 and close to the femtocell 20 and thus, radio interference becomes worse and the frequency with which data retransmission is requested is expected to be high. A negative acknowledgement (NAK) as a hybrid ARQ acknowledgement is transmitted by the (n+4)-th subframe from the data communication terminal 10c to the macrocell 35 and the macrocell 35 transmits retransmission data by the (n+8)-th subframe of downlink.

The femtocell 20 transmits a transport block to the data communication terminal 10a as a femtocell terminal by the (n+6)-th subframe. This is because the femtocell 20 does not detect an uplink of the data communication terminal 10c as a macrocell terminal in the (n+2)-th subframe and allocation priorities are not low. When the femtocell 20 detects an uplink of the data communication terminal 10c in the (n+4)-th subframe and finds that the uplink is a hybrid ARQ acknowledgement, the femtocell 20 lowers an allocation priority of the downlink in the (n+8)-th subframe to prevent downlink allocation.

That is, when the femtocell 20 allocates downlink resources of the data communication terminal 10a as a femtocell terminal, resources of the subframe, which are four subframes before, in which an uplink of the data communication terminal 10c as a macrocell terminal is not detected are preferentially allocated. Further, the femtocell 20 may decide allocation priorities after decoding the uplink signal to determine whether the uplink signal is a hybrid ARQ acknowledgment.

In this manner, it becomes possible to prevent the macrocell 35 and the femtocell 20 from continuing to interfere with each other by lowering priorities of resource allocation so that downlink resources of the femtocell 20 are not allocated to the subframe by which the macrocell 35 is expected to transmit retransmission data.

The femtocell 20 may make interference adjustments based on detection of control information (PDCCH, PHICH) of the macrocell 35. In the uplink interference adjustment method shown in FIG. 9, for example, the femtocell 20 can reliably know subframes and resource blocks used for uplink of the data communication terminal 10c as a macrocell terminal by detecting scheduling information of the uplink to the data communication terminal 10c as a macrocell terminal on PDCCH of the macrocell 35 a hybrid ARQ acknowledgement to the data communication terminal 10c on PHICH of the macrocell 35.

Similarly, in the downlink interference adjustment method shown in FIG. 12, the femtocell 20 can reliably know subframes and resource blocks used for downlink of the data communication terminal 10c by detecting scheduling information of the downlink to the data communication terminal 10c as a macrocell terminal on PDCCH of the macrocell 35.

Detection of scheduling information of the uplink and downlink to the data communication terminal 10c on PDCCH of the macrocell 35 and a hybrid ARQ acknowledgement to the data communication terminal 10c on PHICH by the femtocell 20 is enabled by using, for example, a timing shift of control channels of the macrocell and femtocell as a conventional technology, a temporary stop of downlink transmission of the femtocell in the macrocell control region, and a detection method of the macrocell terminal ID.

Figure 13:
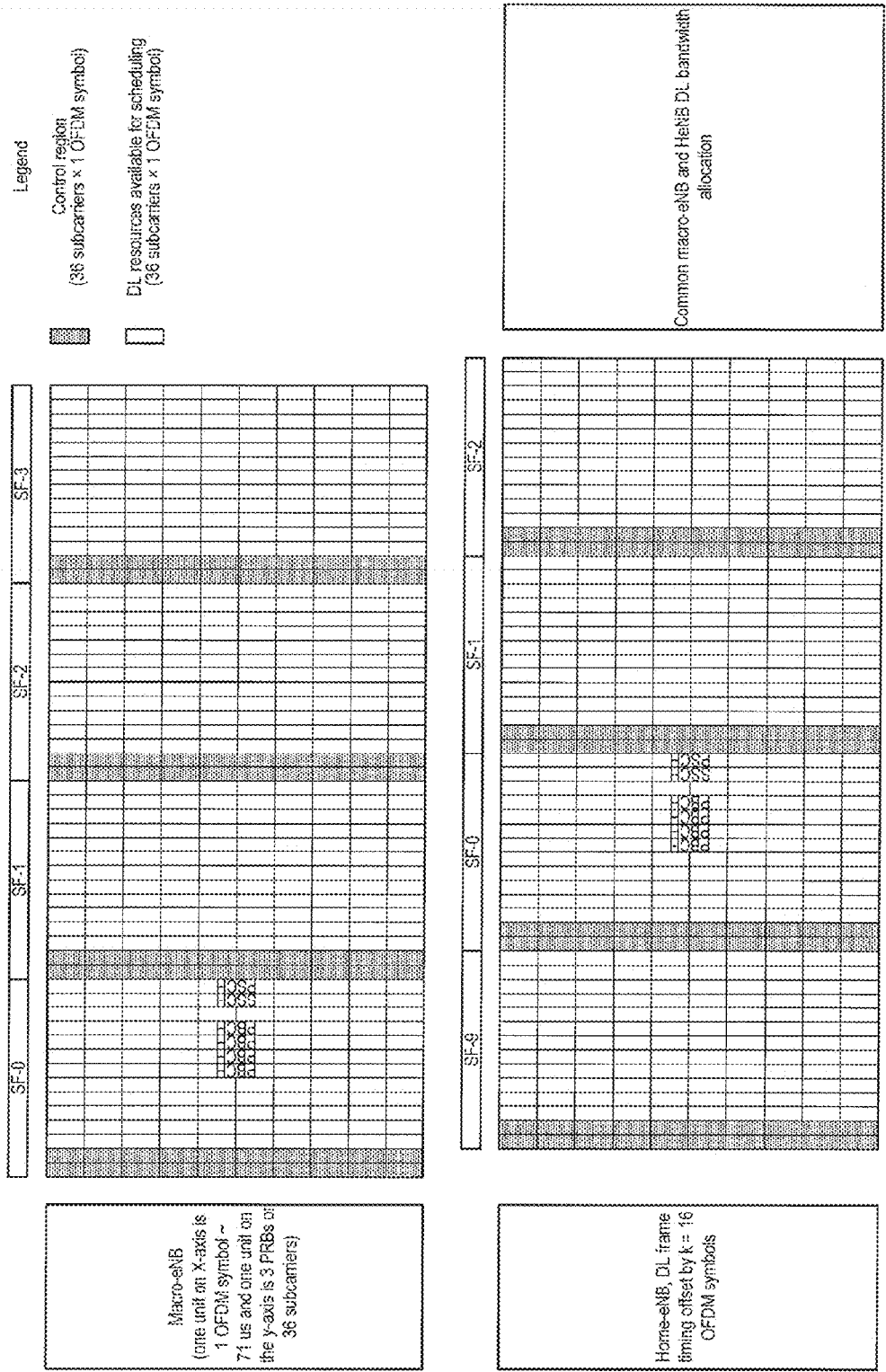
FIG. 13 is an explanatory view showing an example of a timing shift of control channels between a macrocell 35 and the femtocell 20.

FIG. 13 is an explanatory view showing an example of a timing shift of control channels between the macrocell 35 and the femtocell 20. To avoid interference of downlink control channels such as PDCCH, PHICH, PCFICH, and PBCH of the macrocell 35 and the femtocell 20, 3GPP TR 36.921 proposes a timing shift of the symbol level of control channels shown in FIG. 13 and a temporary stop of downlink transmission of the femtocell in the macrocell control region (PDCCH region).

The femtocell 20 can execute the detection method of the macrocell terminal ID as described below. By temporarily stopping downlink transmission of the femtocell 20 in the macrocell control region (PDCCH region), the femtocell 20 can receive PDCCH and PHICH of the macrocell 35.

If, for example, the femtocell 20 in the LTE scheme has a function to store PDCCH information of four subframes received from the macrocell 35 and detects PUSCH of uplink of the data communication terminal 10c as a macrocell terminal, it becomes possible to extract scheduling information corresponding to the resource block of the detected PUSCH from PDCCH information four subframes before and to detect the terminal ID attached to allocation information thereof.

Figure 14:
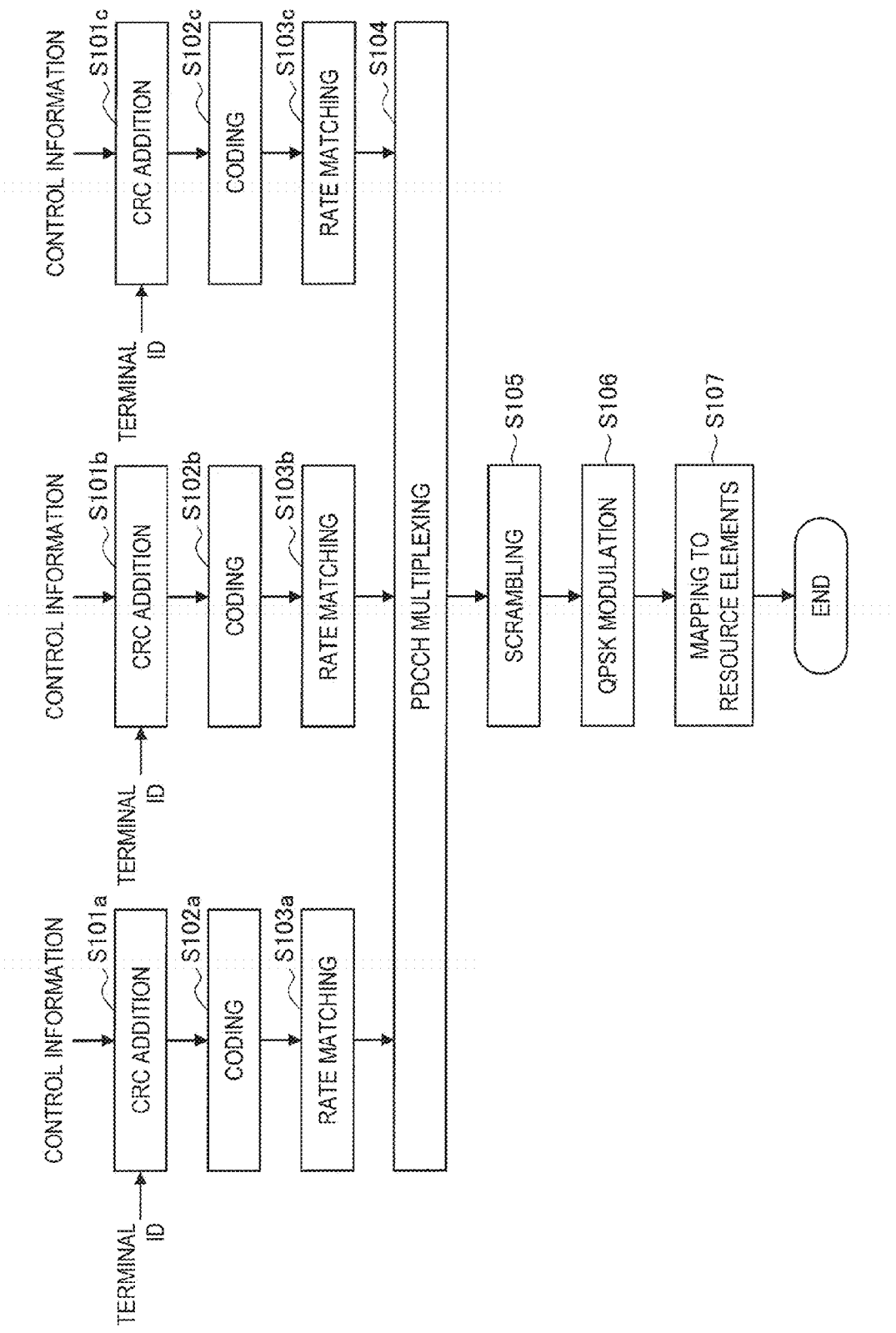
FIG. 14 is an explanatory view showing a processing example of control information of PDCCH.

FIG. 14 is an explanatory view showing a processing example of control information of PDCCH. For example, the resource allocation (scheduling information) of uplink to a terminal is notified by the physical down control channel (PDCCH) of the subframe four subframes before the resource to be allocated. Control information containing the position of the resource block to be allocated, frequency hopping information of uplink, the modulation and coding method, new data display used to clear a buffer by initial transmission, and transmission power control bits for the physical up shared channel (PUSCH) is provided.

The cyclic redundancy check (CRC) is added to the control information (steps S101a, 101b, 101c) and the terminal ID is included for the CRC operation. Accordingly, it becomes possible to decode only scheduling information needed for the terminal without decoding scheduling information addressed to other terminals by decoding only information whose CRC checking is successful using the terminal ID of the terminal. After CRC being added, the control information is encoded by convolutional code (steps S102a, 102b, 102c), the rate is adjusted matching the resource amount of PDCCH transmission (steps S103a, 103b, 103c), and a plurality of pieces of control information is multiplexed (step S104), scrambled by a cell and subframe specific scramble sequence (step S105), QPSK modulated (step S106), and mapped to resource elements (step S107).

The terminal ID can be detected by extracting the corresponding scheduling information from PDCCH of the subframe four subframes before based on the position of the resource block used for PUSCH transmission of the macrocell terminal and reversely detecting the terminal ID with which CRC checking of the scheduling information is successful.

Once the femtocell succeeds in detecting the terminal ID of a macrocell terminal located nearby, scheduling information of uplink and downlink of which the terminal notified thereafter from a macrocell can efficiently be decoded from PDCCH of the macrocell using the terminal ID detected by the femtocell so that resource blocks allocated to uplink and downlink of the femtocell terminal do not overlap with those allocated to the macrocell terminal.

Figure 15:
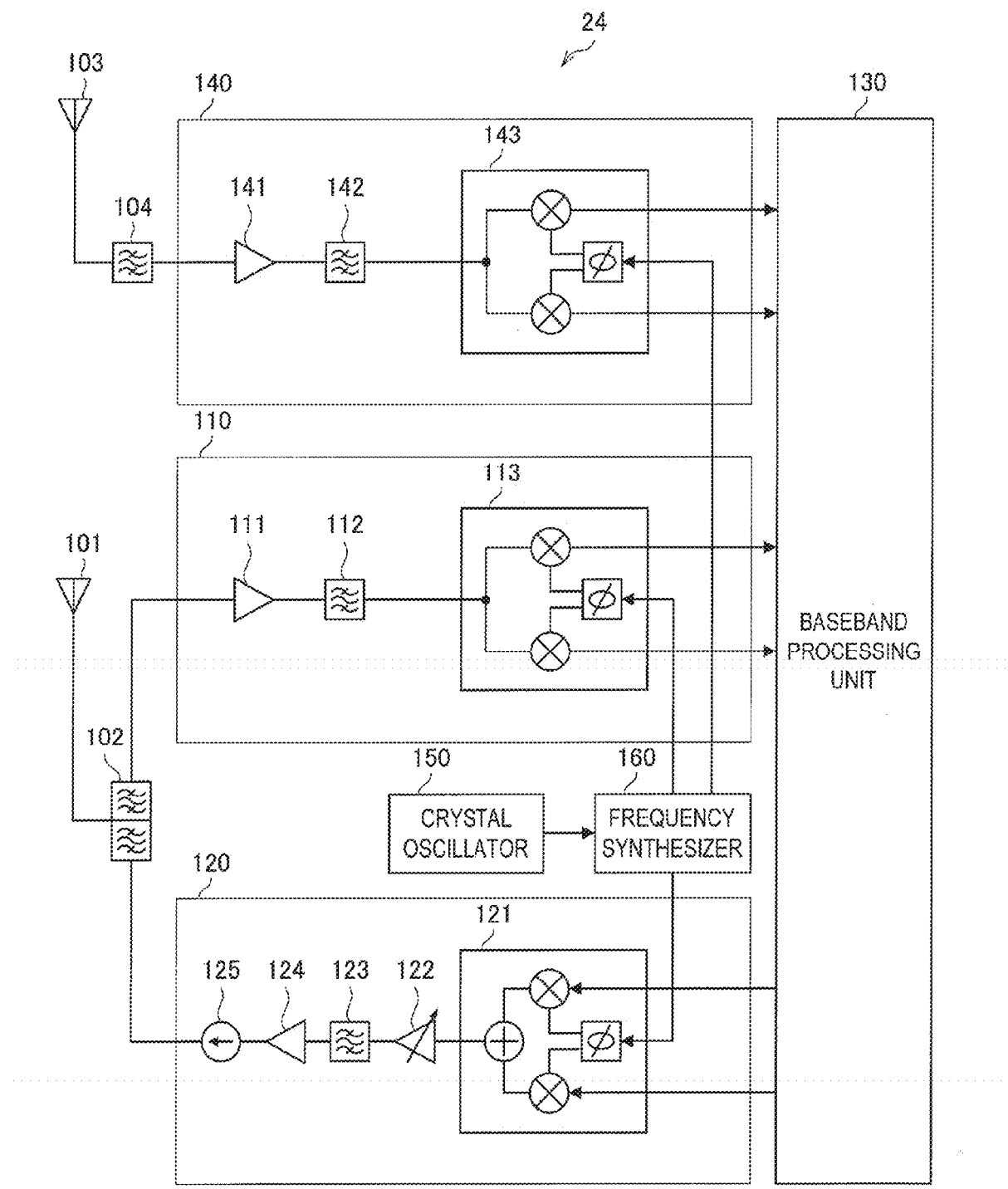
FIG. 15 is an explanatory view showing a configuration example of a radio communication unit 24 in the femtocell 20.

Next, the configuration example of the radio communication unit 24 in the femtocell 20 according to an embodiment of the present disclosure will be described. FIG. 15 is an explanatory view showing a configuration example of the radio communication unit 24 in the femtocell 20 according to an embodiment of the present disclosure. As shown in FIG. 15, for example, the radio communication unit 24 of the femtocell 20 in the frequency division multiplexing (FDD) LTE scheme includes an antenna 101, a duplexer 102, a downlink receiving antenna 103, a downlink receiving RF filter 104, a reception processing unit 110, a transmission processing unit 120, a baseband processing unit 130, a downlink receiving unit 140, a crystal oscillator 150, and a frequency synthesizer 160.

The reception processing unit 110 includes a reception amplifier 111, a receiving RF filter 112, and an orthogonal demodulator 113. The transmission processing unit 120 includes an orthogonal modulator 121, a transmission variable gain amplifier 122, a transmitting RF filter 123, a transmission power amplifier 124, and an isolator 125. The downlink receiving unit 140 includes a reception amplifier 141, a downlink receiving RF filter 142, and an orthogonal demodulator 143.

A signal received by the antenna 101 is sent to the reception processing unit 110 via the duplexer 102. The reception processing unit 110 amplifies the signal sent from the duplexer 102 by the reception amplifier 111 and performs predetermined filtering thereon by the receiving RF filter 112 before demodulating the signal by the orthogonal demodulator 113. The demodulated signal is sent to the baseband processing unit 130.

A signal sent from the baseband processing unit 130 to the transmission processing unit 120 is modulated by the orthogonal modulator 121, amplified by the transmission variable gain amplifier 122 and, after predetermined filtering being performed thereon by the transmitting RF filter 123, amplified by the transmission power amplifier 124 before being sent to the duplexer 102 via the isolator 125 that prevents backflow of signals. Then, the signal sent to the duplexer 102 is transmitted from the antenna 101.

The downlink receiving unit 140 to receive a downlink is used to appropriately set the downlink transmission power of the femtocell 20 by measuring downlink signal intensity of the macrocell 35 whose area overlaps with that of the femtocell 20 so that a downlink transmission wave of the femtocell 20 does not excessively interferes with the downlink of the macrocell 35. The downlink receiving unit 140 is also used to shift control channels of the macrocell 35 and the femtocell 20 to an appropriate symbol level as shown in FIG. 13 by detecting symbol timing of the downlink of the macrocell 35 and receiving system information of the macrocell.

An uplink transmission wave of the data communication terminal 10c as a macrocell terminal using the same frequency band as the femtocell 20 is received, like an uplink transmission wave of the data communication terminal 10a as a femtocell terminal, by the reception processing unit 110 in FIG. 15. Because the data communication terminal 10c, which is far away from the macrocell 35 and close to the femtocell 20, needs to increase uplink transmission power, the femtocell 20 can easily detect an uplink transmission wave of the data communication terminal 10c.

Figure 16:
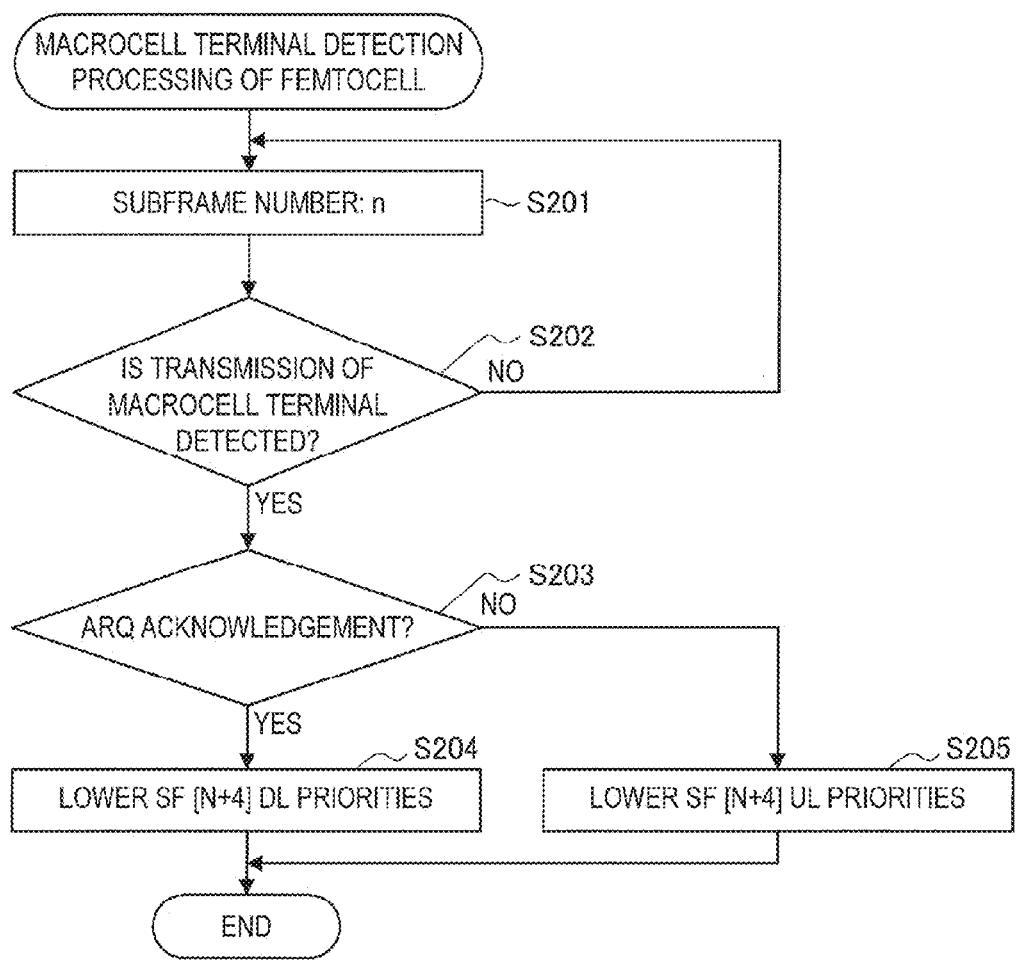
FIG. 16 is a flow chart showing macrocell terminal detection processing of the femtocell 20.

FIG. 16 is a flow chart showing macrocell terminal detection processing of the femtocell 20. The storage unit 26 of the femtocell 20 stores cell IDs of neighboring macrocells and neighboring femtocells. When a PUSCH transmission wave of the macrocell 35 is detected, the femtocell 20 can check whether the serviced base station is a neighboring macrocell from the reference signal sequence contained in the reference signal of the fourth symbol of the slot. Thus, when the n-th subframe is received (step S201), the femtocell 20 determines whether transmission of the macrocell terminal is received (step S202). If transmission of the macrocell terminal is not detected, the femtocell 20 receives the next subframe.

On the other hand, transmission of the macrocell terminal is detected, the femtocell 20 can determine whether the detected PUSCH signal is a hybrid ARQ acknowledgement (step S203). If the PUSCH signal is a hybrid ARQ acknowledgement, the femtocell 20 lowers an allocation priority of downlink scheduling of the subframe four subframes later (step S204) and if the PUSCH signal is not a hybrid ARQ acknowledgement, the femtocell 20 lowers allocation priorities to uplink scheduling of the subframe four subframes later (step S205). In this manner, the femtocell 20 stores allocation priorities for uplink and downlink subframes of four subframes from the current one.

Figure 17:
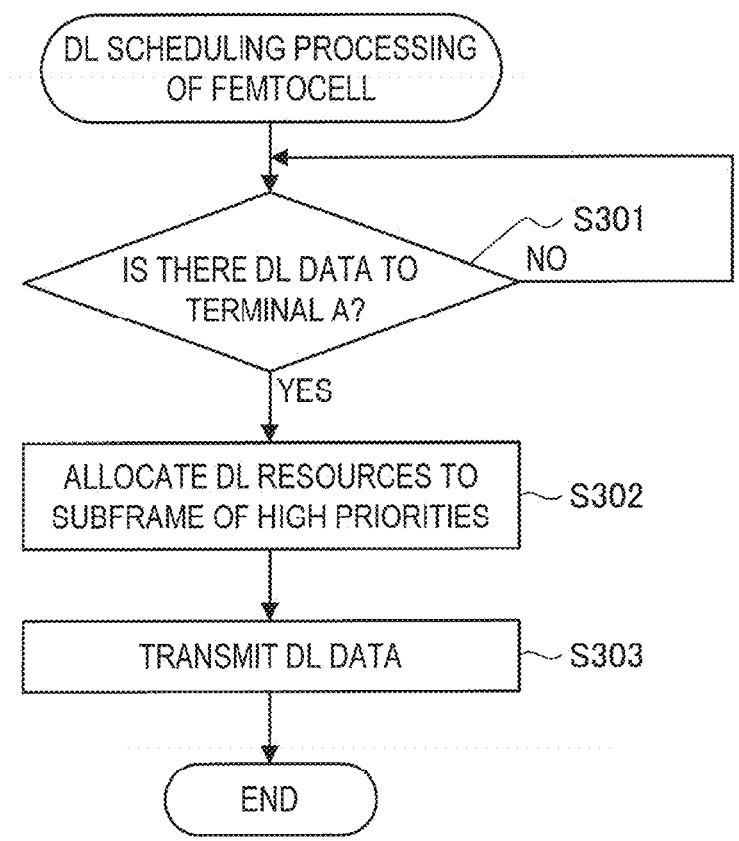
FIG. 17 is a flow chart showing downlink scheduling processing of the femtocell 20.

FIG. 17 is a flow chart showing downlink scheduling processing of the femtocell 20. The femtocell 20 determines whether downlink data to the data communication terminal 10a as a femtocell terminal has arisen (step S301) and if downlink data to the data communication terminal 10a has arisen, the femtocell 20 checks allocation priorities of four subframes of the next subframe and thereafter and if allocation priorities of the next subframe are not low, the subframe is allocated and if allocation priorities of the next subframe are low, another subframe is allocated (step S302).

Figure 18:
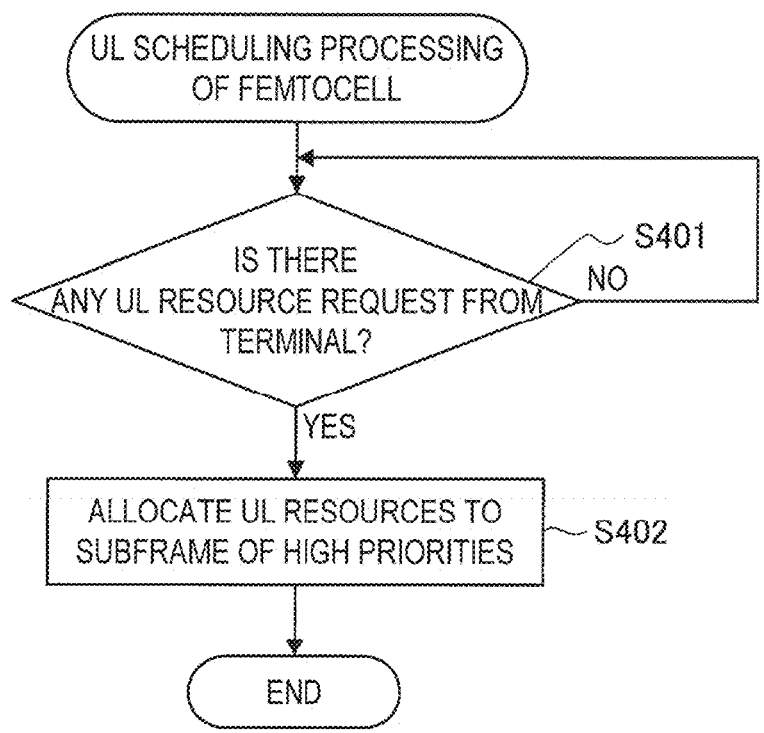
FIG. 18 is a flow chart showing uplink scheduling processing of the femtocell 20.

FIG. 18 is a flow chart showing uplink scheduling processing of the femtocell 20. The femtocell 20 determines whether any uplink resource request is transmitted from the data communication terminal 10a as a femtocell terminal to the femtocell 20 (step S401) and if an uplink resource request is transmitted from the data communication terminal 10a to the femtocell 20, the femtocell 20 checks allocation priorities of four subframes of the first subframe that can be allocated and thereafter and if allocation priorities of the first subframe are not low, the subframe is allocated and if allocation priorities of the first subframe are low, another subframe is allocated (step S402).

By performing downlink scheduling processing and uplink scheduling processing in this manner, the femtocell 20 can prevent deterioration of throughput of the femtocell terminal.

3. CONCLUSION

As has been described above, when there is a terminal (the data communication terminal 10c as a macrocell terminal) serviced by a base station other than the femtocell 20 according to an embodiment of the present disclosure and the terminal has no access rights to the femtocell 20, the femtocell 20 can prevent an uplink transmission wave of the terminal from excessively interfering with reception of uplink of the femtocell and easily prevent deterioration of throughput of the femtocell terminal and interruption of communication.

More specifically, the femtocell 20 according to an embodiment of the present disclosure detects the presence of the data communication terminal 10c and allocates radio resources used for uplink transmission to the data communication terminal 10a so that radio resources used for uplink transmission of the data communication terminal 10c and radio resources used for uplink transmission of the data communication terminal 10a as a femtocell terminal do not overlap. By allocating radio resources in this manner, the femtocell 20 according to an embodiment of the present disclosure can prevent throughput of the femtocell terminal from deteriorating.

Also, when there is a base station (the data communication terminal 10c as a macrocell terminal) serviced by a base station (macrocell 35) other than the femtocell 20 according to an embodiment of the present disclosure near the femtocell 20 and the terminal has no access rights to the femtocell 20, the femtocell 20 can prevent a downlink transmission wave of the femtocell 20 from excessively interfering with downlink reception of the terminal and prevent deterioration of throughput of terminals of other base stations and interruption of communication.

Also, the femtocell 20 according to an embodiment of the present disclosure detects the terminal identifier (terminal ID) from uplink transmission of a macrocell terminal near the femtocell 20 and detects radio resources allocated to the macrocell terminal from the macrocell 35 so that interference between the femtocell 20 and the macrocell 35 can be reduced by allocating radio resources to the femtocell terminal in such a way that radio resources used by the femtocell terminal do not overlap.

The operation of the femtocell 20 according to an embodiment of the present disclosure described above may be implemented by hardware or by software. When the operation is implemented by software, for example, a computer program may be stored inside the femtocell 20 so that the computer program is read and executed by a CPU or a control apparatus provided inside the femtocell 20.

In the foregoing, a preferred embodiment of the present disclosure has been described in detail with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, when the terminal detection unit 51 of the femtocell 20 detects a plurality of uplink signals, the resource allocation unit 52 may change allocation priorities in accordance with intensity of the uplink signal such as lowering an allocation priority of radio resources used by the terminal having transmitted the strongest uplink signal. This is because the terminal having transmitted the strongest uplink signal is considered to be positioned near the femtocell 20 and collisions can be avoided by allocating such radio resources less frequently. When the terminal detection unit 51 of the femtocell 20 detects transmission of a plurality of uplink signals from the same terminal, the resource allocation unit 52 may change allocation priorities in accordance with the number of times of detecting an uplink signal from each terminal such as lowering allocation priorities of radio resources used by the terminal.

The present technology can also adopt configurations as described below:

(1)
A radio base station including:
a terminal detection unit that detects an uplink signal of a first terminal serviced by another base station;
a storage unit that stores allocation priorities of radio resources for a predetermined period; and
a resource allocation unit that allocates the radio resources to a second terminal serviced by a local station using the allocation priorities of the radio resources stored in the storage unit,
wherein, when the terminal detection unit detects the uplink signal of the first terminal, the resource allocation unit preferentially allocates the radio resources of an uplink of a high priority to the second terminal while lowering a priority of the radio resources estimated to be used next for the uplink by the first terminal.

(2)
The radio base station according to (1), wherein the resource allocation unit lowers the priority of the radio resources estimated to be used for transmission of retransmission data of uplink data transmitted by the first terminal.

(3)
The radio base station according to (1) or (2), wherein when the terminal detection unit detects the uplink signals from a plurality of the first terminals, the resource allocation unit changes the allocation priorities in accordance with intensity of the uplink signal.

(4)
The radio base station according to (3), wherein when the terminal detection unit detects the uplink signals from a plurality of the first terminals, the resource allocation unit lowers the allocation priority of the radio resources used by the first terminal having transmitted the strongest uplink signal.

(5)
The radio base station according to any one of (1) to (4), wherein when the uplink signal from the first terminal is detected a plurality of times, the resource allocation unit changes the allocation priorities in accordance with a number of times of detecting the uplink signal from each terminal.

(6)
The radio base station according to (5), wherein when the uplink signal from the first terminal is detected the plurality of times, the resource allocation unit lowers the allocation priority of the radio resources estimated to be used next for the uplink by the first terminal.

(7)
The radio base station according to any one of (1) to (6), further including: a downlink receiving unit that receives a downlink signal from the other base station,
wherein the storage unit receives and stores allocation information of the radio resources of the other base station received by the downlink receiving unit for the predetermined period, and
wherein, when the terminal detection unit detects the uplink signal of the first terminal, the resource allocation unit determines an identifier of the first terminal from the allocation information of the radio resources stored in the storage unit and received by the downlink receiving unit.

(8)
The radio base station according to (7), wherein the resource allocation unit detects the radio resources of the uplink and a downlink allocated to the first terminal from the identifier of the first terminal and the allocation information of the radio resources of the other base station, lowers the allocation priority of the radio resources allocated to the first terminal, and preferentially allocates the radio resources of the higher allocation priorities to the second terminal serviced by the local station.

(9)
A radio base station including:
a terminal detection unit that detects an uplink signal of a first terminal serviced by another base station;
a storage unit that stores allocation priorities of radio resources for a predetermined period; and
a resource allocation unit that allocates the radio resources to a second terminal serviced by a local station using the allocation priorities of the radio resources stored in the storage unit,
wherein, when the terminal detection unit detects the uplink signal of the first terminal, the resource allocation unit preferentially allocates the radio resources of a downlink of a high priority to the second terminal while lowering a priority of the radio resources estimated to be used next for the downlink by the first terminal.

(10)
The radio base station according to (9), wherein the resource allocation unit lowers the allocation priorities to the radio resources estimated to be used for transmission of retransmission data from the other base station to the first station in response to a retransmission request from the first terminal to the other base station.

(11)

The radio base station according to (9) or (10), wherein when the terminal detection unit detects the uplink signal of the first terminal, the resource allocation unit determines whether the uplink signal is a retransmission request signal and, when the uplink signal is the retransmission request signal, lowers the allocation priority of the radio resources estimated to be used next for the downlink by the first terminal.

(12)

A communication control method of a radio base station including:

a terminal detection step of detecting an uplink signal of a first terminal serviced by another base station;

a storage step of storing allocation priorities of radio resources for a predetermined period; and a resource allocation step of allocating the radio resources to a second terminal serviced by a local station using the allocation priorities of the radio resources stored in the storage step, wherein, when the terminal detection step detects the uplink signal of the first terminal, the resource allocation step preferentially allocates the radio resources of an uplink of a high priority to the second terminal while lowering a priority of the radio resources estimated to be used next for the uplink by the first terminal.

(13)

A communication control method of a radio base station including:

a terminal detection step of detecting an uplink signal of a first terminal serviced by another base station;

a storage step of storing allocation priorities of radio resources for a predetermined period; and a resource allocation step of allocating the radio resources to a second terminal serviced by a local station using the allocation priorities of the radio resources stored in the storage step, wherein, when the terminal detection step detects the uplink signal of the first terminal, the resource allocation step preferentially allocates the radio resources of a downlink of a high priority to the second terminal while lowering priorities of the radio resources estimated to be used next for the downlink by the first terminal.

(14)

A computer program causing a computer to execute:

a terminal detection step of detecting an uplink signal of a first terminal serviced by another base station;

a storage step of storing allocation priorities of radio resources for a predetermined period; and a resource allocation step of allocating the radio resources to a second terminal serviced by a local station using the allocation priorities of the radio resources stored in the storage step, wherein, when the terminal detection step detects the uplink signal of the first terminal, the resource allocation step preferentially allocates the radio resources of an uplink of a high priority to the second terminal while lowering a priority to the radio resources estimated to be used next for the uplink by the first terminal.

(15)

A computer program causing a computer to execute:

a terminal detection step of detecting an uplink signal of a first terminal serviced by another base station;

a storage step of storing allocation priorities of radio resources for a predetermined period; and a resource allocation step of allocating the radio resources to a second terminal serviced by a local station using the allocation priorities of the radio resources stored in the storage step, wherein, when the terminal detection step detects the uplink signal of the first terminal, the resource allocation step preferentially allocates the radio resources of a downlink of a high priority to the second terminal while lowering a priority of the radio resources estimated to be used next for the downlink by the first terminal.

REFERENCE SIGNS LIST 1 data communication system
10a, 10b, 10c data communication terminal
20 femtocell
22 control unit
24 radio communication unit
25 IP communication unit
26 storage unit
31 internet
32 femtocell gateway
33 core network
34 BB line modem
35 macrocell
40 femtocell management server
41 storage unit
42 IP communication unit
51 terminal detection unit
52 resource allocation unit
101 antenna
102 duplexer
103 downlink receiving antenna
110 reception processing unit
111 reception amplifier
112 receiving RF filter
113 orthogonal demodulator
120 transmission processing unit
121 orthogonal modulator
122 transmission variable gain amplifier
123 transmitting RF filter
124 transmission power amplifier
125 isolator
130 baseband processing unit
140 downlink receiving unit
141 reception amplifier
142 downlink receiving RF filter
143 orthogonal demodulator
150 crystal oscillator
160 frequency synthesizer

The invention claimed is:

1. A radio base station comprising:
a terminal detection unit that detects an uplink signal of a first terminal serviced by another base station;
a storage unit that stores an allocation priority of a radio resource for a first predetermined period; and
a resource allocation unit that allocates a radio resource to a second terminal serviced by the radio base station, using the allocation priority of the radio resource stored in the storage unit,
wherein, when the terminal detection unit detects the uplink signal of the first terminal, the resource allocation unit preferentially allocates a radio resource of an uplink of a high allocation priority to the second terminal while lowering an allocation priority of a radio resource estimated to be used next for the uplink by the first terminal.

2. The radio base station according to claim 1, wherein the resource allocation unit lowers a priority of a radio resource estimated to be used for transmission of retransmission data of uplink data transmitted by the first terminal.

3. The radio base station according to claim 1, wherein, when the terminal detection unit detects the uplink signals from a plurality of the first terminals, the resource allocation unit changes the allocation priority in accordance with intensity of the uplink signals.

4. The radio base station according to claim 3, wherein, when the terminal detection unit detects the uplink signals from a plurality of the first terminals, the resource allocation unit lowers an allocation priority of a radio resource used by the first terminal having transmitted the strongest uplink signal.

5. The radio base station according to claim 1, wherein, when the uplink signals from the first terminals are detected a plurality of times, the resource allocation unit changes the allocation priority in accordance with how many times the uplink signals have been detected for each terminal.

6. The radio base station according to claim 5, wherein, when the uplink signals from the first terminals are detected a plurality of times, the resource allocation unit lowers the allocation priority to the radio resource estimated to be used next for the uplink by the first terminal.

7. The radio base station according to claim 1, further comprising:
a downlink receiving unit that receives a downlink signal from the other base station,
wherein the storage unit receives and stores allocation information on a radio resource of the other base station received by the downlink receiving unit for a second predetermined period, and
wherein, when the terminal detection unit detects the uplink signal of the first terminal, the resource allocation unit determines an identifier of the first terminal from the allocation information on the radio resource stored in the storage unit and received by the downlink receiving unit.

8. The radio base station according to claim 7, wherein the resource allocation unit detects radio resources of the uplink and a downlink allocated to the first terminal from the identifier of the first terminal and the allocation information on the radio resource of the other base station, lowers allocation priorities of the radio resources allocated to the first terminal, and preferentially allocates the radio resource of the higher allocation priority to the second terminal serviced by the radio base station.

9. A radio base station comprising:
a terminal detection unit that detects an uplink signal of a first terminal serviced by another base station;
a storage unit that stores an allocation priority of a radio resource for a predetermined period; and
a resource allocation unit that allocates a radio resource to a second terminal serviced by the radio base station, using the allocation priority of the radio resource stored in the storage unit,
wherein, when the terminal detection unit detects the uplink signal of the first terminal, the resource allocation unit preferentially allocates a radio resource of a downlink of a high allocation priority to the second terminal while lowering an allocation priority of a radio resource estimated to be used next for the downlink by the first terminal.

10. The radio base station according to claim 9, wherein the resource allocation unit lowers an allocation priority of a radio resource estimated to be used for transmission of retransmission data from the other base station to the first station in response to a retransmission request from the first terminal to the other base station.

11. The radio base station according to claim 9, wherein, when the terminal detection unit detects the uplink signal of the first terminal, the resource allocation unit determines whether the uplink signal is a retransmission request signal, and when the uplink signal is the retransmission request signal, the resource allocation unit lowers the allocation priority of the radio resource estimated to be used next for the downlink by the first terminal.

12. A communication control method of a radio base station, the communication control method comprising:
detecting an uplink signal of a first terminal serviced by another base station;
storing an allocation priority of a radio resource for a predetermined period; and
allocating a radio resource to a second terminal serviced by the radio base station, using the stored allocation priority of the radio resource,
wherein, when the uplink signal of the first terminal is detected, allocating the radio resource to preferentially allocate a radio resource of an uplink of a high allocation priority to the second terminal while lowering an allocation priority of a radio resource estimated to be used next for the uplink by the first terminal.

13. A communication control method of a radio base station comprising:
detecting an uplink signal of a first terminal serviced by another base station;
storing an allocation priority of a radio resource for a predetermined period; and
allocating a radio resource to a second terminal serviced by the radio base station, using the stored allocation priority of the radio resource,
wherein, when the uplink signal of the first terminal is detected, allocating the radio resource to preferentially allocate a radio resource of a downlink of a high allocation priority to the second terminal while lowering an allocation priority of a radio resource estimated to be used next for the downlink by the first terminal.

14. A non-transitory computer-readable storage medium having stored thereon, a set of computer executable instructions for causing a computer to perform steps comprising:
detecting an uplink signal of a first terminal serviced by another base station;
storing an allocation priority of a radio resource for a predetermined period; and
allocating a radio resource to a second terminal serviced by a radio base station, using the stored allocation priority of the radio resource,
wherein, when the uplink signal of the first terminal is detected, allocating the radio resource to preferentially allocate a radio resource of an uplink of a high allocation priority to the second terminal while lowering an allocation priority of a radio resource estimated to be used next for the uplink by the first terminal.

15. A non-transitory computer-readable storage medium having stored thereon, a set of computer executable instructions for causing a computer to perform steps comprising:
detecting an uplink signal of a first terminal serviced by another base station;
storing an allocation priority of a radio resource for a predetermined period; and allocating a radio resource to a second terminal serviced by a radio base station, using the stored allocation priority of the stored radio resource, wherein, when the uplink signal of the first terminal is detected, allocating the radio resource to preferentially allocate a radio resource of a downlink of a high allocation priority to the second terminal while lowering an allocation priority of a radio resource estimated to be used next for the downlink by the first terminal.

* * * * *